United States Patent
Morita et al.

(10) Patent No.: US 10,778,865 B2
(45) Date of Patent: Sep. 15, 2020

(54) IMAGE PROCESSING APPARATUS, IMAGE PROCESSING SYSTEM, AND IMAGE PROCESSING METHOD

(71) Applicant: RICOH COMPANY, Ltd., Ohta-ku (JP)

(72) Inventors: Kenichiro Morita, Tokyo (JP); Shoh Nagamine, Kanagawa (JP); Kumiko Yoshida, Tokyo (JP); Yoichiro Matsuno, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 144 days.

(21) Appl. No.: 15/879,503

(22) Filed: Jan. 25, 2018

(65) Prior Publication Data

US 2018/0227457 A1 Aug. 9, 2018

(30) Foreign Application Priority Data

Feb. 9, 2017 (JP) .................. 2017-022254

(51) Int. Cl.
*H04N 1/21* (2006.01)
*H04N 1/00* (2006.01)
(Continued)

(52) U.S. Cl.
CPC ....... *H04N 1/2104* (2013.01); *H04N 1/00095* (2013.01); *H04N 5/232* (2013.01);
(Continued)

(58) Field of Classification Search
CPC .. H04N 1/2104; H04N 1/00095; H04N 5/765; H04N 5/23238
See application file for complete search history.

(56) References Cited

U.S. PATENT DOCUMENTS

2008/0211901 A1 9/2008 Civanlar et al.
2016/0165136 A1 6/2016 Mitsui et al.
(Continued)

FOREIGN PATENT DOCUMENTS

JP 2004-007283 1/2004
JP 2004-254031 9/2004
(Continued)

OTHER PUBLICATIONS

U.S. Appl. No. 15/707,490, filed Sep. 28, 2017, Kumiko Yoshida, et al.
(Continued)

*Primary Examiner* — Ruiping Li
(74) *Attorney, Agent, or Firm* — Xsensus LLP

(57) ABSTRACT

An image processing apparatus communicable with an image capturing device that captures image data includes circuitry. The circuitry acquires the image data captured by the image capturing device. The circuitry acquires type data indicating a type of the image capturing device. The circuitry determines the type of the image capturing device based on the acquired type data. Based on the determined type of the image capturing device, the circuitry determine a type of image processing to be performed on the acquired image data, and performs the determined image processing on the acquired image data.

10 Claims, 22 Drawing Sheets

(51) Int. Cl.

| | | |
|---|---|---|
| *H04N 5/765* | (2006.01) | |
| *H04N 5/232* | (2006.01) | |
| *H04N 5/77* | (2006.01) | |
| *H04N 9/82* | (2006.01) | |
| *H04N 7/14* | (2006.01) | |
| *H04N 7/18* | (2006.01) | |

(52) U.S. Cl.
CPC ......... *H04N 5/23238* (2013.01); *H04N 5/765* (2013.01); *H04N 5/77* (2013.01); *H04N 7/142* (2013.01); *H04N 7/147* (2013.01); *H04N 7/18* (2013.01); *H04N 9/8205* (2013.01)

(56) References Cited

U.S. PATENT DOCUMENTS

2018/0027178 A1* 1/2018 Macmillan ......... H04N 5/23238 348/38

2018/0199029 A1* 7/2018 Van Der Auwera ........................ H04N 13/161

FOREIGN PATENT DOCUMENTS

| JP | 2005-094713 | 4/2005 |
| JP | 2008-085930 | 4/2008 |
| JP | 2010-166235 | 7/2010 |
| JP | 2011-223076 | 11/2011 |
| JP | 2012-178135 | 9/2012 |
| JP | 2015-173424 | 10/2015 |
| JP | 2016-110639 | 6/2016 |

OTHER PUBLICATIONS

U.S. Appl. No. 15/707,553, filed Sep. 18, 2017, Kenichiro Morita, et al.

* cited by examiner

IMAGE PROCESSING APPARATUS, IMAGE PROCESSING SYSTEM, AND IMAGE PROCESSING METHOD

CROSS-REFERENCE TO RELATED APPLICATION

This patent application is based on and claims priority pursuant to 35 U.S.C. § 119(a) to Japanese Patent Application No. 2017-022254, filed on Feb. 9, 2017, in the Japan Patent Office, the entire disclosure of which is hereby incorporated by reference herein.

BACKGROUND

Technical Field

The present disclosure relates to an image processing apparatus, an image processing system, and an image processing method.

Description of the Related Art

Videoconference systems are now in widespread use, allowing users at remote places to hold a meeting via a communication network such as the Internet. In such videoconference systems, a communication terminal for a remote conference system is provided in a conference room where attendants of one party in a remote conference are attending. This communication terminal collects an image or video of the conference room including the attendants and sound such as speech made by the attendants, and transmits digital data converted from the collected image (video) and/or sound to the other party's terminal provided at a different conference room. Based on the transmitted digital data, the other party's terminal displays images on a display or outputs audio from a speaker in the different conference room to enable video calling. This enables to carry out a conference among remote sites, in a state close to an actual conference.

In addition, relay apparatuses are also in widespread use, which receive image data and audio data from a first communication terminal and relay the received image and audio data to a second communication terminal. The second communication terminal requests the relay apparatus for the image data of a desired resolution depending on the resolution of a display of the own terminal. This enables to suppress unnecessary communication, thereby smoothly performing a remote conference without communication being interrupted even in a communication network having a narrow communication band.

On the other hand, a technique is known, that connects, to a communication terminal, an image capturing device that is capable of capturing a full spherical panoramic image in real time. The communication terminal distributes the full spherical panoramic image obtained from the image capturing device to each communication terminal of the other party. Each communication terminal of the other party sequentially converts the received full spherical panoramic image to a planar image representing a predetermined area, which is a part of the full spherical panoramic image, and displays the planar image on a display or the like.

SUMMARY

An image processing apparatus communicable with an image capturing device that captures image data includes circuitry. The circuitry acquires the image data captured by the image capturing device. The circuitry acquires type data indicating a type of the image capturing device. The circuitry determines the type of the image capturing device based on the acquired type data. Based on the determined type of the image capturing device, the circuitry determine a type of image processing to be performed on the acquired image data, and performs the determined image processing on the acquired image data.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

Figure 1:
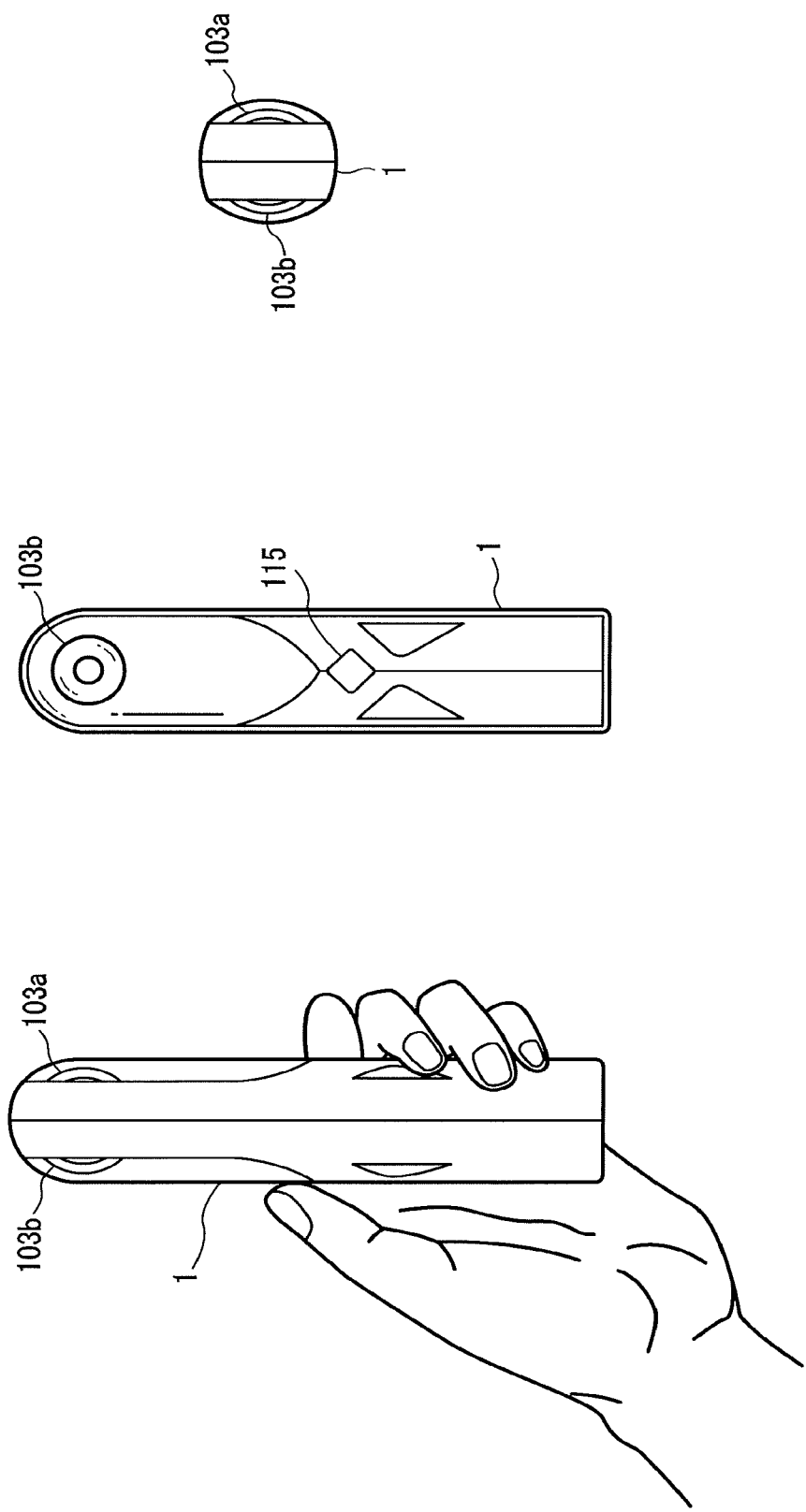
FIG. 1A is a left side view of an image capturing device according to an embodiment of the present disclosure.
FIG. 1B is a front view of the image capturing device of FIG. 1A.
FIG. 1C is a plan view of the image capturing device of FIG. 1A.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Referring to the drawings, embodiments of the present invention are described.

Overview of Embodiment

<Example of Generation of Full Spherical Panoramic Image>

With reference to FIGS. 1 to 7, a description is given of generating a full spherical panoramic image.

First, a description is given of an external view of an image capturing device 1, with reference to FIGS. 1A to 1C.

FIGS. 1A to 1C are diagrams, each illustrating an example of the image capturing device 1 according to an embodiment of the present disclosure. In an example of FIGS. 1A to 1C, the image capturing device 1 is a digital camera for capturing images from which a 360-degree full spherical panoramic image is generated. More specifically, FIG. 1A is a left side view of the image capturing device 1. FIG. 1B is a front view of the image capturing device 1. FIG. 1C is a plan view of the image capturing device 1.

As illustrated in FIG. 1A, the image capturing device 1 has a shape such that one can hold it with one hand, for example. Further, as illustrated in FIGS. 1A to 1C, an imaging element 103a is provided on a front side (anterior side) of an upper section of the image capturing device 1, and an imaging element 103b is provided on a back side (rear side) thereof. These imaging elements (image sensors) 103a and 103b are used in combination with optical members (e.g., fisheye lenses 102a and 102b, described later), each being capable of capturing a hemispherical image having an angle of view of 180 degrees or wider. Furthermore, as illustrated in FIG. 1B, an operation unit 115 such as a shutter button is provided on an opposite side of the front side of the image capturing device 1.

Hereinafter, a description is given of a situation where the image capturing device 1 is used, with reference to FIG. 2.

Figure 2:
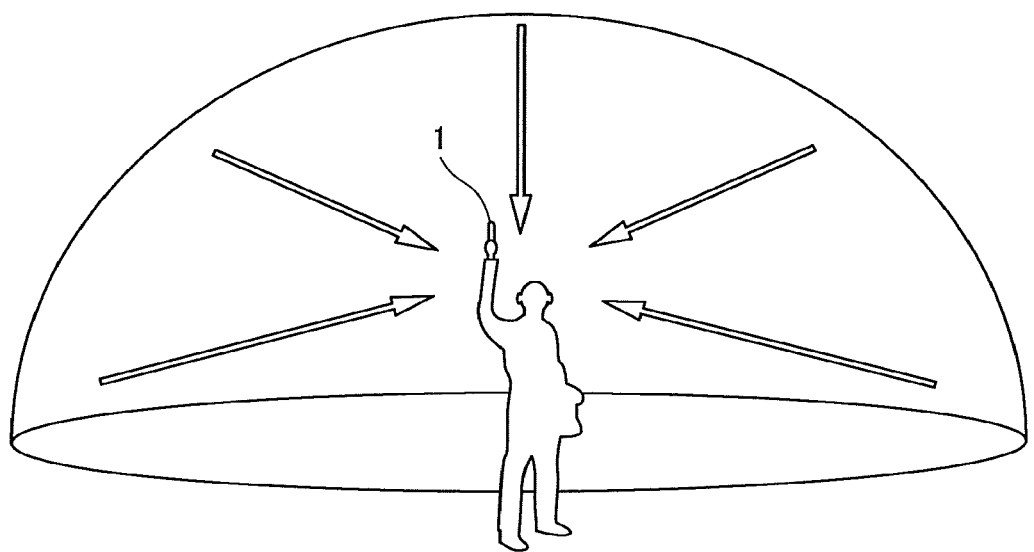
FIG. 2 illustrates how a user uses the image capturing device, according to an embodiment of the present disclosure.

FIG. 2 illustrates how a user uses the image capturing device 1, according to an embodiment of the present disclosure. For example, the image capturing device 1a is used as illustrated in FIG. 2. More specifically, as illustrated in FIG. 2, for example, the image capturing device 1 is used for capturing objects surrounding the user who is holding the image capturing device 1 in his/her hand. The imaging elements 103a and 103b illustrated in FIGS. 1A to 1C capture the objects surrounding the user to obtain two hemispherical images.

Hereinafter, a description is given of an overview of an operation of generating a full spherical panoramic image from images captured by the image capturing device 1, with reference to FIGS. 3A to 3C and FIGS. 4A and 4B. The image captured by the image capturing device, from which the full spherical panoramic image is generated is referred to as a "hemispherical image", hereinafter.

Figure 3A:
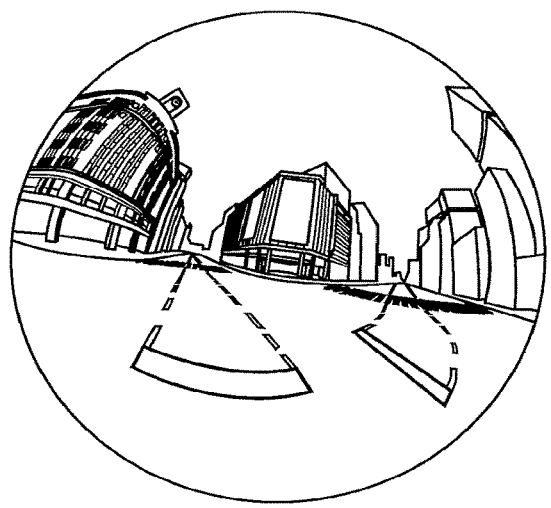
FIG. 3A to 3C are illustrations for describing an example of generation of a full spherical panoramic image according to an embodiment of the present disclosure.
Figure 3B:
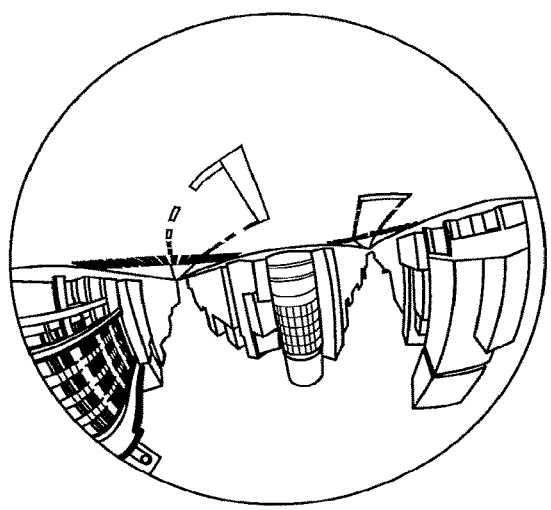

FIGS. 3A to 3C and FIGS. 4A and 4B are illustrations for describing an example of generation of a full spherical panoramic image according to an embodiment of the present disclosure. More specifically, FIG. 3A is a view illustrating an example of a hemispherical image (front side) captured by the image capturing device 1. FIG. 3B is a view illustrating an example of a hemispherical image (back side) captured by the image capturing device 1.

Figure 3C:
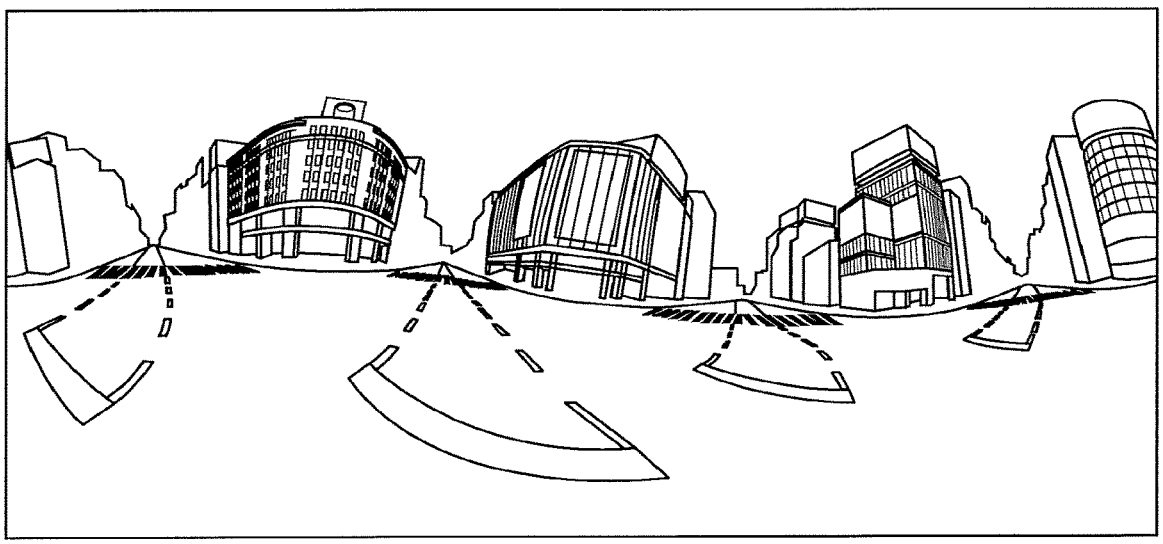
Figure 4B:
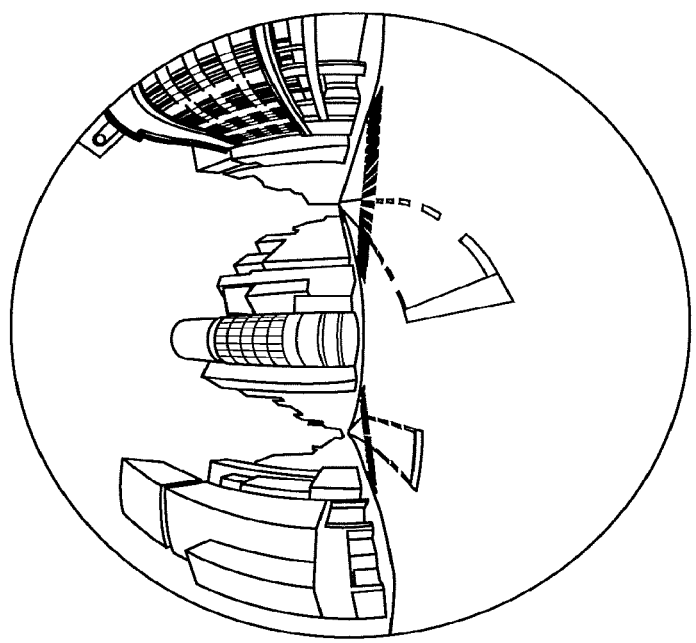
FIG. 4A to 4B are illustrations for describing an example of generation of a full spherical panoramic image according to an embodiment of the present disclosure.
Figure 4A:
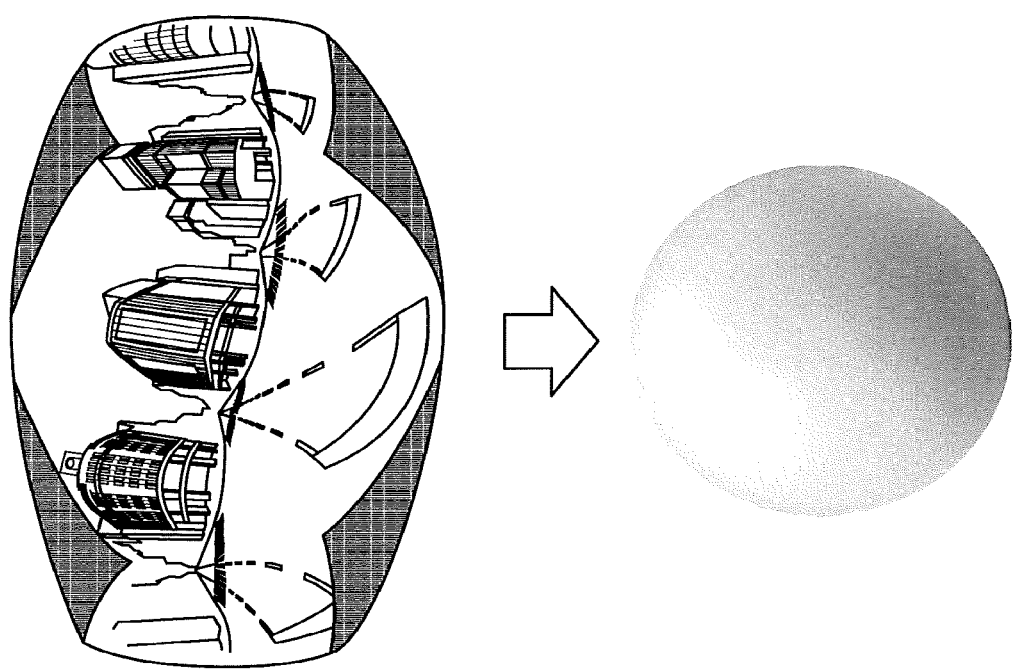

FIG. 3C is a view illustrating an image generated from the hemispherical images illustrated in FIGS. 3A and 3B by the Mercator projection. The image generated by Mercator projection based on the hemispherical images is referred to as a "Mercator image" hereinafter. FIG. 4A illustrates an example of how the Mercator image covers a surface of a sphere. FIG. 4B is a view illustrating an example of the full spherical panoramic image.

As illustrated in FIG. 3A, an image captured by the imaging element 103a is a curved hemispherical image (front side) taken through the fisheye lens 102a described later. Further, as illustrated in FIG. 3B, an image captured by the imaging element 103b is a curved hemispherical image (back side) taken through the fisheye lens 102b described later. The hemispherical image (front side) and the hemispherical image (back side), which is reversed by 180-degree from each other, is combined by the image capturing device 1. Thus, the Mercator image as illustrated in FIG. 3C is generated.

The Mercator image is pasted on the sphere surface using Open Graphics Library for Embedded Systems (OpenGL (registered trademark) ES) as illustrated in FIG. 4A. Thus, the full spherical panoramic image as illustrated in FIG. 4B is generated.

In other words, the full spherical panoramic image is an image of the Mercator image facing toward a center of the sphere. It should be noted that OpenGL (registered trademark) ES is a graphic library for visualizing two-dimensional (2D) and three-dimensional (3D) data. The full spherical panoramic image is either a still image or a movie.

One may feel strange viewing the full spherical panoramic image, because the full spherical panoramic image is an image attached to the sphere surface. To resolve this strange feeling, an image processing apparatus according to an embodiment of the present disclosure displays an image of a predetermined area, which is a part of the full spherical panoramic image, as a planar image having fewer curves. The image of the predetermined area is referred to as a "predetermined-area image" hereinafer. Hereinafter, a description is given of displaying the predetermined-area image with reference to FIG. 5 and FIGS. 6A and 6B.

Figure 5:
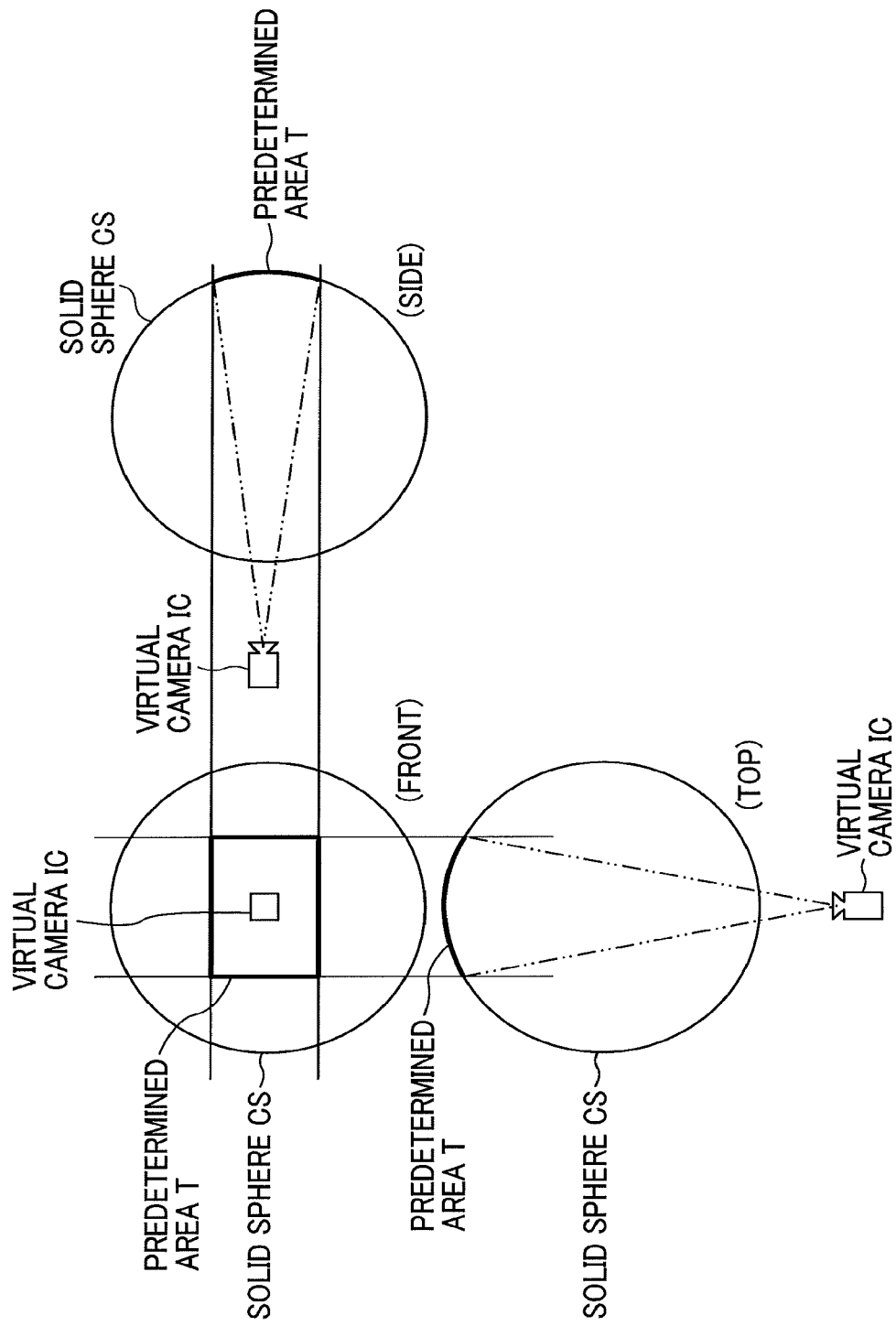
FIG. 5 is a view illustrating an example of the position of each of a virtual camera and a predetermined area according to an embodiment of the present disclosure.

FIG. 5 is a view illustrating an example of the position of each of a virtual camera and a predetermined area according to an embodiment of the present disclosure. More specifically, FIG. 5 is a view illustrating an example of the position of each of a virtual camera IC and a predetermined area T in a case in which the full spherical panoramic image is represented as a three-dimensional solid sphere.

The virtual camera IC corresponds to a point of view (viewpoint) of a user who is viewing the full spherical panoramic image represented as the three-dimensional solid sphere.

Figure 6A:
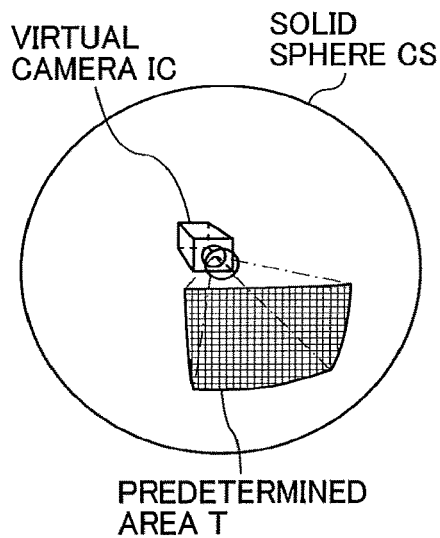
FIG. 6A is a perspective view of FIG. 5.
Figure 6B:
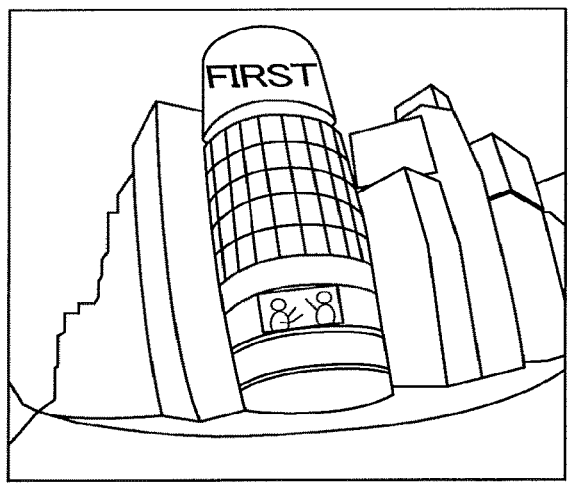
FIG. 6B is a view illustrating an example of an image of the predetermined area on a display according to an embodiment of the present disclosure.

FIG. 6A is a perspective view illustrating an example of the position of each of a virtual camera and a predetermined area, according to an embodiment of the present disclosure. FIG. 6B is a view illustrating a predetermined-area image on a display, according to an embodiment of the present disclosure. In other words, FIG. 6A is a perspective view of FIG. 5. FIG. 6B is a view illustrating the predetermined-area image displayed on a display. Furthermore, in this example, the full spherical panoramic image illustrated in FIG. 4B is represented as a three-dimensional solid sphere CS.

Assuming that the full spherical panoramic image is the solid sphere CS as described, the virtual camera IC is outside of the full spherical panoramic image as illustrated in FIG. 5. The predetermined area T in the full spherical panoramic image is an imaging area of the virtual camera IC. The predetermined area T is specified by position coordinates in a three-dimensional virtual space in which the full spherical panoramic image is included. More specifically, the position coordinates are predetermined-area information such as (x(rH), y(rV), angle of view α (angle)). The angle of view α is angle of view of the virtual camera IC.

The image processing apparatus is able express the predetermined area T as being zoomed by enlarging or reducing a range (arc) of the angle of view α. Further, zooming of the predetermined area T is implemented by moving the virtual camera IC toward or away from the full spherical panoramic image.

The predetermined-area image, which is an image indicating the predetermined area T (FIG. 6A), is displayed as an image of a region captured by the virtual camera IC, as illustrated in FIG. 6B. FIG. 6B illustrates an example of the displayed predetermined-area image, based on position coordinates that is set by default. In another example, the predetermined area T may be specified by an imaging area (X, Y, Z) of the virtual camera IC, rather than the predetermined-area information or the position coordinates of the virtual camera IC. In the following, a description is given of an example in which the predetermined area T is specified by the position coordinates (x(rH), Y(rV), angle of view α (angle)).

Hereinafter, a description is given of a relation between the predetermined-area information and the predetermined area T with reference to FIG. 7.

Figure 7:
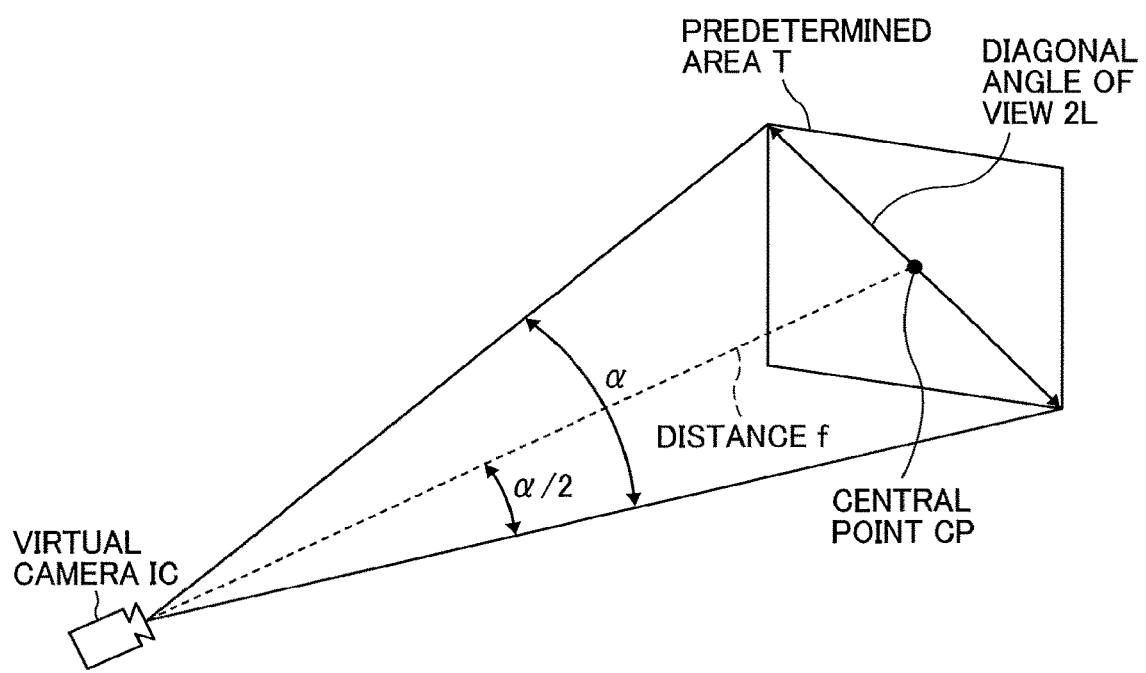
FIG. 7 is a view illustrating an example of a relation between predetermined-area information and the predetermined area according to an embodiment of the present disclosure.

FIG. 7 is a view illustrating an example of a relation between the predetermined-area information and the predetermined area T according to an embodiment of the present disclosure. In the drawing, a diagonal angle of view of the predetermined area T is indicated by 2L. In this case, a center point CP of the diagonal angle of view 2L provides the (x, y) parameters of the predetermined-area information. f is a distance from the virtual camera IC to the center point CP. L is a distance between the center point CP and a given vertex of the predetermined area T (2L is a diagonal line). In an example of FIG. 7, a trigonometric function equation expressed by the following equation (1) is satisfied.

$$L/f=\tan(\alpha/2)  \quad \text{(Equation 1)}$$

<Example of Configuration of Image Communication System>

Hereinafter, a description is given of an overview of a configuration example of an image communication system according to an embodiment of the present disclosure, with reference to FIG. 8.

Figure 8:
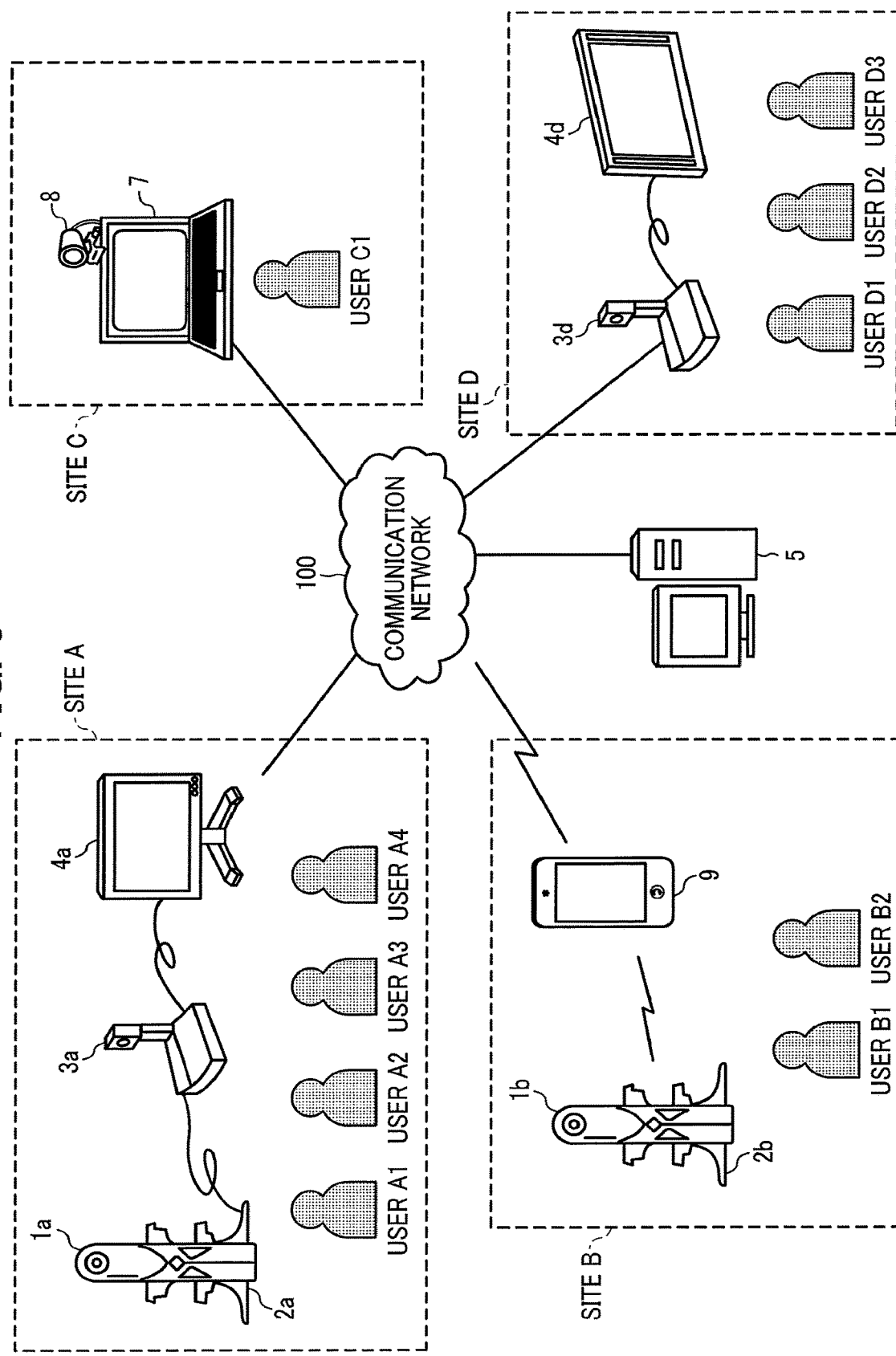
FIG. 8 is a schematic diagram illustrating an example of an image communication system according to an embodiment of the present disclosure.

FIG. 8 is a schematic diagram illustrating an example of the image communication system according to an embodiment of the present disclosure. As illustrated in the drawing, the image communication system includes an image capturing device 1a, an image capturing device 1b, a videoconference terminal 3a, a videoconference terminal 3d, a display 4a, a display 4d, a communication management system 5, a personal computer (PC) 7, an image capturing device 8, and a smartphone 9.

The videoconference terminal 3a, the videoconference terminal 3d, the smartphone 9, and the PC 7 communicate data with one another via a communication network 100 such as the Internet. The communication network 100 may be either a wireless network or a wired network.

Each of the image capturing device 1a and the image capturing device 1b is a digital camera, which captures an image of a subject or surroundings to obtain two hemispherical images, from which a full spherical panoramic image is generated, as described above. By contrast, the image capturing device 8 is a digital camera that captures an image of a subject or surroundings to obtain a planar image.

Figure 10:
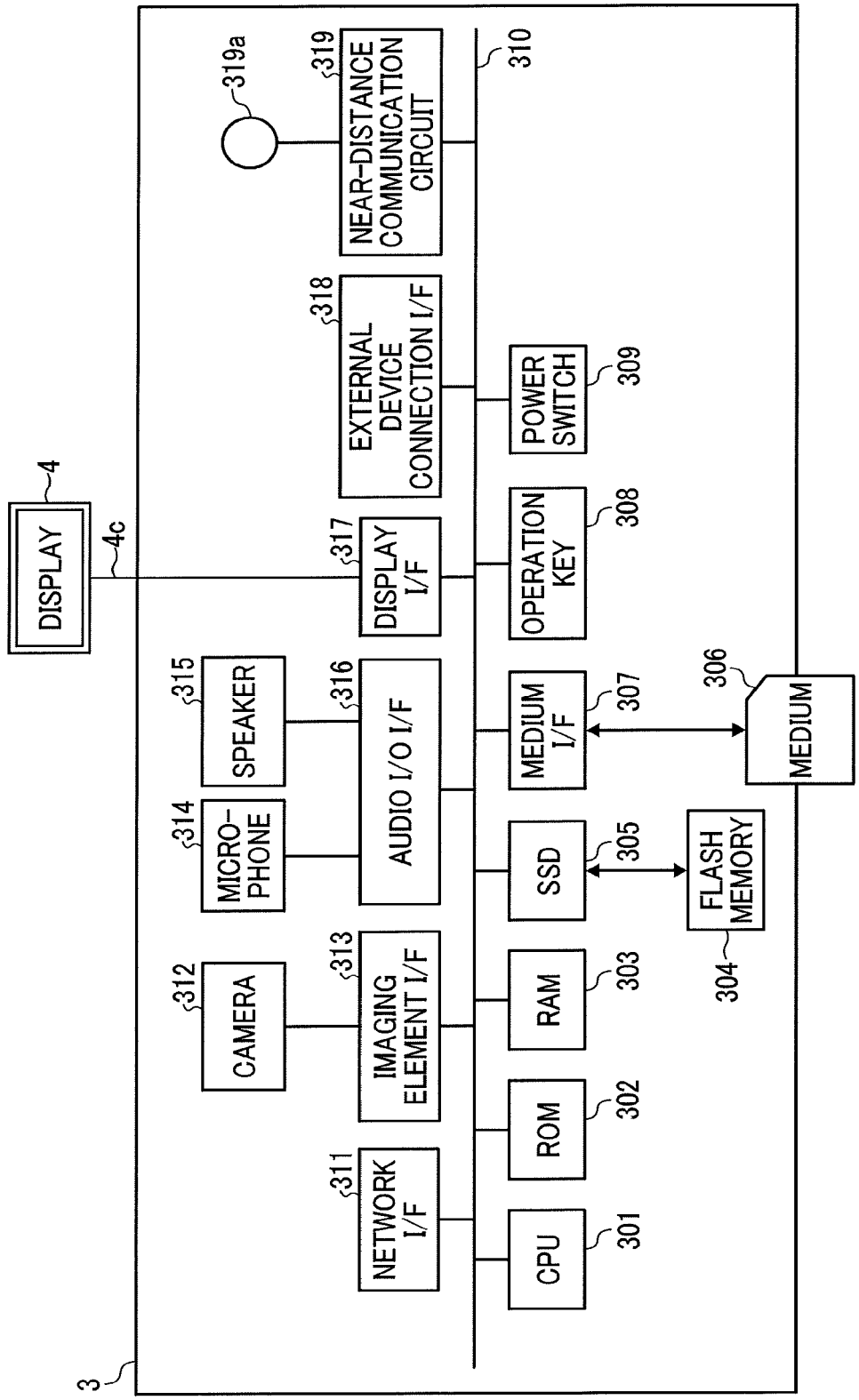
FIG. 10 is a block diagram illustrating an example of a hardware configuration of a videoconference terminal, according to an embodiment of the present disclosure.

The videoconference terminals 3a and the videoconference terminal 3d are each a terminal dedicated to videoconferencing. The videoconference terminal 3a and the videoconference terminal 3d display an image of video calling on the displays 4a and 4d, respectively, via a wired cable such as a universal serial bus (USB). The videoconference terminal 3a captures images by a built-in camera 312 (FIG. 10). However, in a case in which the videoconference terminal 3a is connected to a cradle 2a on which the image capturing device 1a is mounted by a wired cable, the image capturing device 1a is preferentially used. Thus, the videoconference terminal 3a is able to obtain two hemispherical images, from which a full spherical panoramic image is generated.

When a wired cable is used for connecting the videoconference terminal 3a and the cradle 2a, the cradle 2a not only enables communications between the image capturing device 1a and the videoconference terminal 3a but also supplies power with the image capturing device 1a and holds the image capturing device 1a. In this example, the image capturing device 1a, the cradle 2a, the videoconference terminal 3a, and the display 4a are located at a site A. In addition, in this example, four users A1, A2, A3 and A4 are participating in a video call at the site A.

On the other hand, the videoconference terminal 3d and the display 4d are located at a site D. In addition, in this example, three users D1, D2 and D3 are participating in a video call at the site D.

The communication management system 5 manages and controls communication of the videoconference terminal 3a, the videoconference terminal 3d, the PC 7 and the smartphone 9. Further, the communication management system 5 manages types of image data exchanged. Examples of the type of image data include a general image type and a special image type. Therefore, the communication management system 5 also operates as a communication control system. In this example, the special image is a full spherical panoramic image, for example.

The communication management system 5 is located, for example, at a service provider that provides video communication service. In one example, the communication management system 5 is configured as a single computer. In another example, the communication management system 5 is constituted as a plurality of computers.

The PC 7 performs video calling with the image capturing device 8 connected thereto. In this example, the PC 7 and the image capturing device 8 are located at a site C. In addition, in this example, a single user C1 is participating in a video call at the site C.

The smartphone 9 includes a display 917 (FIG. 12), and displays an image (video) of video calling on the display 917. Further, the smartphone 9 captures images with a complementary metal oxide semiconductor (CMOS) sensor 905 (FIG. 12), for example.

In addition, the smartphone 9 is also capable of obtaining data of two hemispherical images captured by the image capturing device 1b, based on which a full spherical panoramic image is generated, by wireless communication such as Wireless Fidelity (Wi-Fi) and Bluetooth (registered trademark). In a case in which wireless communication is used for obtaining the data of two hemispherical images, a cradle 2b supplies power with the image capturing device 1b and holds the image capturing device 1b. In this example, the image capturing device 1b, the cradle 2b, and the smartphone 9 are located at a site B. In addition, in this example, two users B1 and B2 are participating in a video call at the site B.

The videoconference terminal 3a, the videoconference terminal 3d, the PC 7 and the smartphone 9 are each an example of a communication terminal. OpenGL (registered trademark) ES is installed in each of those communication terminals. Using OpenGL (registered trademark), the videoconference terminal 3a, the videoconference terminal 3d, the PC 7, and the smartphone 9 generate predetermined-area information that indicates a partial area of a full spherical panoramic image, or generate a predetermined-area image from a full spherical panoramic image that is transmitted from a different communication terminal.

The arrangement of the terminals, apparatuses and users illustrated in FIG. 8 is just an example, and any other suitable arrangement will suffice. For example, in the site C, an image capturing device that is capable of performing image capturing for a full spherical panoramic image may be used in place of the image capturing device 8. In addition, examples of the communication terminal include a digital television, a smartwatch, a car navigation device, and the combination of at least two of those devices.

Hereinafter, any arbitrary one of the image capturing device 1a and the image capturing device 1b may be referred to as "image capturing device 1". Further, any arbitrary one of the videoconference terminal 3a and the videoconference terminal 3d may be referred to as "videoconference terminal 3", hereinafter. Furthermore, any arbitrary one of the display 4a and the display 4d may be referred to as "display 4", hereinafter.

<Example of Hardware Configuration>

Hereinafter, a description is given of examples of hardware configurations of the image capturing device 1, the videoconference terminal 3, the communication management system 5, the PC 7, and the smartphone 9 according to this embodiment, with reference to FIGS. 9 to 12. Since a general-purpose camera may be used as the image capturing device 8, a detailed description thereof is omitted.

<Example of Hardware Configuration of Image Capturing Device 1>

Figure 9:
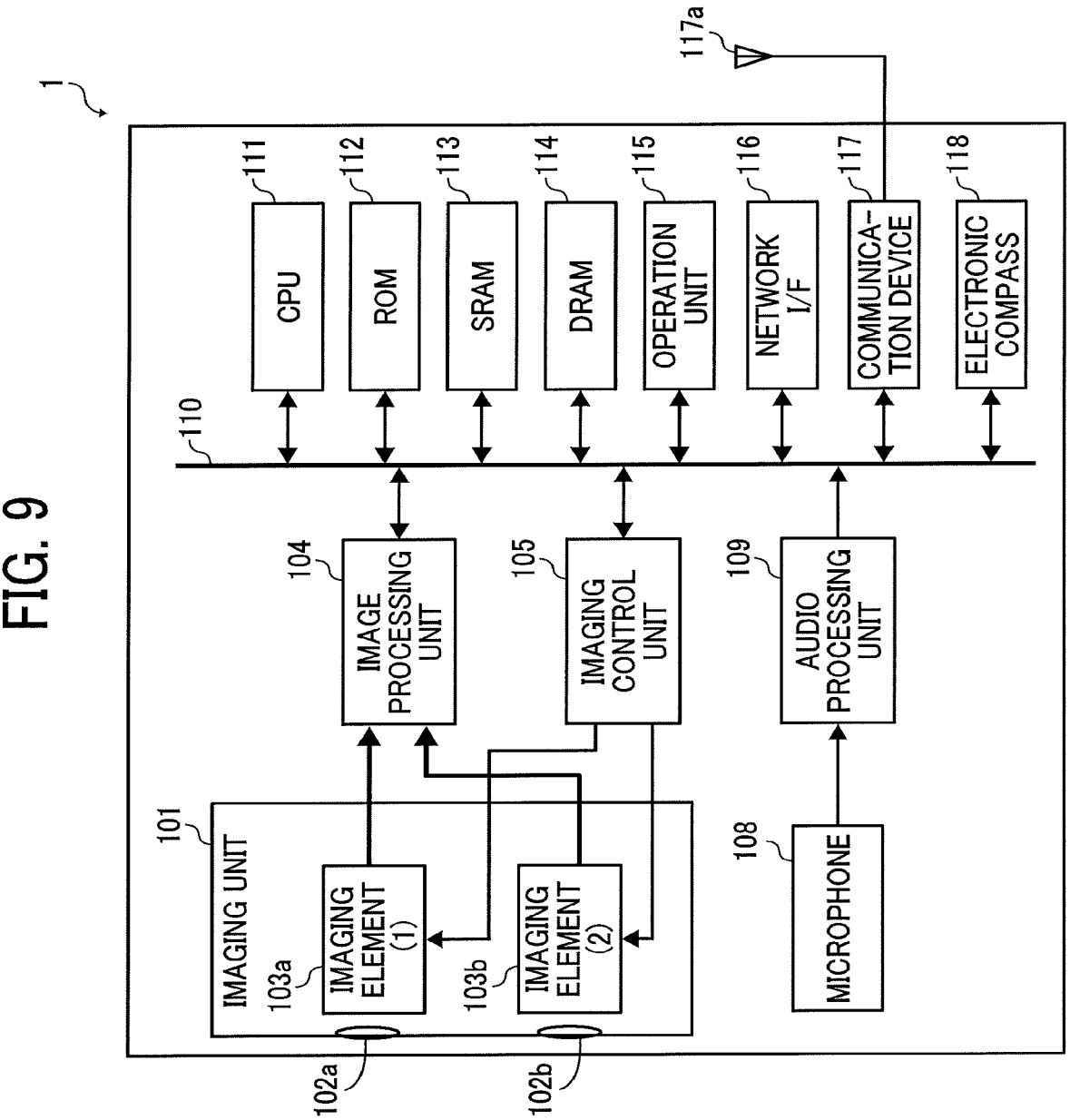
FIG. 9 is a block diagram illustrating an example of a hardware configuration of the image capturing device according to an embodiment of the present disclosure.

First, a description is given of an example hardware configuration of the image capturing device 1, with reference to FIG. 9.

FIG. 9 is a block diagram illustrating an example of a hardware configuration of the image capturing device 1 according to an embodiment of the present disclosure. A description is given hereinafter of an example in which the image capturing device 1 is a full spherical (omnidirectional) image capturing device that uses two imaging elements. However, the image capturing device 1 may include three or more imaging elements. In addition, the image capturing device 1 is not necessarily an image capturing device dedicated to omnidirectional image capturing. For example, the image capturing device 1 may a device having substantially the same function as the illustrated image capturing device 1, which is implemented by retrofitting a general-purpose digital camera or a smartphone with an external omnidirectional image capturing unit.

As illustrated in the drawing, the image capturing device 1 includes an imaging unit 101, an image processing unit 104, an imaging control unit 105, a microphone 108, an audio processing unit 109, a central processing unit (CPU) 111, a read only memory (ROM) 112, a static random access memory (SRAM) 113, a dynamic random access memory (DRAM) 114, an operation unit 115, a network interface (I/F) 116, a communication device 117, an antenna 117a, and an electronic compass 118.

The imaging unit 101 includes two wide-angle lenses (so-called fish-eye lenses) 102a and 102b, each having an angle of view of equal to or greater than 180 degrees so as to form a hemispherical image. The imaging unit 101 further includes the two imaging elements 103a and 103b corresponding to the wide-angle lenses 102a and 102b respectively.

The imaging elements 103a and 103b include image sensors such as CMOS sensors and charge-coupled device (CCD) sensors, which convert optical images formed by the fisheye lenses 102a and 102b respectively into electric signals to output image data. Further, the imaging elements 103a and 103b each includes a timing generation circuit, which generates horizontal or vertical synchronization signals, pixel clocks and the like for the image sensor. Furthermore, the imaging elements 103a and 103b each includes a group of registers, in which various commands, parameters and the like for operations of an imaging element are set.

Each of the imaging elements 103a and 103b of the imaging unit 101 is connected to the image processing unit 104 via a parallel I/F bus. In addition, each of the imaging elements 103a and 103b of the imaging unit 101 is connected to the imaging control unit 105 via a serial I/F bus such as an 12C (registered trademark) bus. The image processing unit 104 and the imaging control unit 105 are each connected to the CPU 111 via a bus 110. Furthermore, the ROM 112, the SRAM 113, the DRAM 114, the operation unit 115, the network I/F 116, the communication device 117, and the electronic compass 118 are also connected to the bus 110.

The image processing unit 104 acquires image data from each of the imaging elements 103a and 103b via the parallel I/F bus. The image processing unit 104 further performs predetermined processing on each of the acquired image data, and combines these image data. Thus, data of the Mercator image as illustrated in FIG. 3C is generated.

The imaging control unit 105 functions as a master device while the imaging elements 103a and 103b each functions as a slave device. The imaging control unit 105 sets commands and the like in the group of registers of the imaging elements 103a and 103b via the 12C (registered trademark) bus. The imaging control unit 105 receives necessary commands from the CPU 111. Further, the imaging control unit 105 acquires status data to be set in the group of registers of the imaging elements 103a and 103b using the 12C (registered trademark) bus. The imaging control unit 105 sends the acquired status data to the CPU Ill.

The imaging control unit 105 instructs the imaging elements 103a and 103b to output the image data at a time when the shutter button of the operation unit 115 is pressed.

The image capturing device 1 may display a preview image on a display (e.g., a display of the videoconference terminal 3a) or may support displaying movie. In this case, image data are continuously output from the imaging elements 103a and 103b at a predetermined frame rate (frames per minute).

Furthermore, the imaging control unit 105 operates in cooperation with the CPU 111 to synchronize times when the imaging elements 103a and 103b output the image data. The image capturing device 1 may include a display unit, such as a display.

The microphone 108 converts sounds to audio data (signal). The audio processing unit 109 acquires the audio data from the microphone 108 via an I/F bus and performs predetermined processing on the audio data.

The CPU 111 controls an entire operation of the image capturing device 1. Further, the CPU 111 executes processes performed by the image capturing device 1. The ROM 112 stores various programs to enable the CPU 111 to execute processes. The SRAM 113 and the DRAM 114 each operates as a work memory to store programs loaded from the ROM 112 for execution by the CPU 111 or data in current processing. More specifically, the DRAM 114 stores image data currently processed by the image processing unit 104 and data of the Mercator image on which processing has been performed.

The operation unit 115 includes various operation keys, a power switch, the shutter button, and a touch panel having functions of both displaying information and receiving input from a user, which may be used in combination. The user operates the operation keys, etc. to input various photographing modes or photographing conditions to the image capturing device 1.

The network I/F 116 collectively refers to an interface circuit such as a USB I/F that allows the image capturing device 1 to communicate data with an external media such as an SD (registered trademark) card or an external device. The network I/F 116 connects the image capturing device to an external device, etc., though either wired or wireless communication. For example, the data of the Mercator image, which is stored in the DRAM 114, is stored in an external media via the network I/F 116 or transmitted to an external apparatus such as the videoconference terminal 3a via the network I/F 116.

The communication device 17 communicates data with an external device via the antenna 117a of the image capturing device 1 by Wi-Fi (registered trademark) or near distance wireless communication such as Near Field Communication (NFC). The image capturing device 1 may transmit the data of Mercator image to an external apparatus using the communication device 117.

The electronic compass 118 calculates an orientation and a tilt (roll angle) of the image capturing device 1 from the Earth's magnetism to output orientation and tilt information. This orientation and tilt information is related information (metadata) described in compliance with Exchangeable image format (Exif). Further, the orientation anti tile information is used for image processing such as image correction of captured images. Further, the related information also includes a date and time when an image is captured by the image capturing device 1, and a size of image data.

<Example of Hardware Configuration of Videoconference Terminal 3>

Hereinafter, a description is given of a hardware configuration of the videoconference terminal 3 with reference to FIG. 10.

FIG. 10 is a block diagram illustrating an example of a hardware configuration of the videoconference terminal 3, according to an embodiment of the present disclosure. As illustrated in the drawing, the videoconference terminal 3 includes a CPU 301, a ROM 302, a RAM 303, a flash memory 304, a solid state drive (SSD) 305, a medium I/F 307, an operation key 308, a power switch 309, a bus line 310, a network I/F 311, a camera 312, an imaging element I/F 313, a microphone 314, a speaker 315, an audio input/output I/F 316, a display I/F 317, an external device connection I/F 318, a near-distance communication circuit 319, and an antenna 319a for the near-distance communication circuit 319.

The CPU 301 controls an entire operation of the videoconference terminal 3. The ROM 302 stores programs such as an Initial Program Loader (IPL) to boot the CPU 301. The RAM 303 is used as a work area for the CPU 301. The flash memory 304 stores various data such as a communication control program, image data, and audio data. The SSD 305 controls reading or writing of various data to and from storage media such as the flash memory 304 under control of the CPU 301. A hard disc drive (HDD) may be used in place of an SSD. The medium I/F 307 controls reading or writing (storing) of data with respect to a storage medium 306 such as a flash memory. The operation key 308 is operated by a user to input a user instruction such as a user selection of a communication destination of the videoconference terminal 3. Furthermore, the power switch 309 is a switch for switching the power supply of the videoconference terminal 3 to "ON" or "OFF".

The network I/F 311 enables communication through a communication network 100 such as the Internet. The camera 312 is an example of a built-in imaging device capable of performing image capturing under control of the CPU 301. The imaging element I/F 313 is a circuit that controls the camera 312. The microphone 314 is an example of a built-in audio collecting device capable of inputting audio.

The audio input/output I/F 316 is a circuit for controlling input and output of audio signals between the microphone 314 and the speaker 315 under control of the CPU 301. The display I/F 317 is a circuit for transmitting image data to the display 4 under control of the CPU 301. The external device connection I/F 318 is an interface circuit that connects the videoconference terminal 3 to external devices. The near-distance communication circuit 319 is a communication circuit that communicates in compliance with the NFC (registered trademark), the Bluetooth (registered trademark) and the like.

Examples of the bus line 310 include an address bus and a data bus, which electrically connects the hardware components such as the CPU 301 to one another.

The display 4 is an output device that displays an image of a subject, an operation icon, or the like. For example, the display 4 is a device constituted as a liquid crystal or organic electroluminescence (EL) display. The display 4 is connected to the display I/F 317 by a cable 4c. For example, the cable 4c may be an analog red green blue (RGB) (video graphic array (VGA)) signal cable, a component video cable, a high-definition multimedia interface (HDMI) (registered trademark) signal cable, or a digital video interactive (DVI) signal cable.

The camera 312 includes an optical system such as a lens, and a solid-state imaging element that converts an image (video) of a subject to electronic data by converting light to electric charge. Examples of the solid-state imaging element include a CMOS sensor and a CCD sensor.

The external device connection I/F 318 is capable of connecting an external device such as an external camera, an external microphone, or an external speaker through a USB cable or the like. In a case in which an external camera is connected, the external camera is driven in preference to the built-in camera 312 under control of the CPU 301. Similarly, in a case in which an external microphone is connected or an external speaker is connected, the external microphone or the external speaker is driven in preference to the built-in microphone 314 or the built-in speaker 315 under control of the CPU 301.

The storage medium 306 is a storage medium removable from the videoconference terminal 3. In addition to or in alternative to the flash memory 304, any suitable auxiliary memory, such as an electrically erasable and programmable ROM (EEPROM), may be used, provided that it is a nonvolatile memory that reads or writes data under control of CPU 301.

<Example of Hardware Configuration of Communication Management System 5 and PC 7>

Hereinafter, a description is given of examples of hardware configurations of the communication management system 5 and the PC 7, with reference to FIG. 11.

Figure 11:
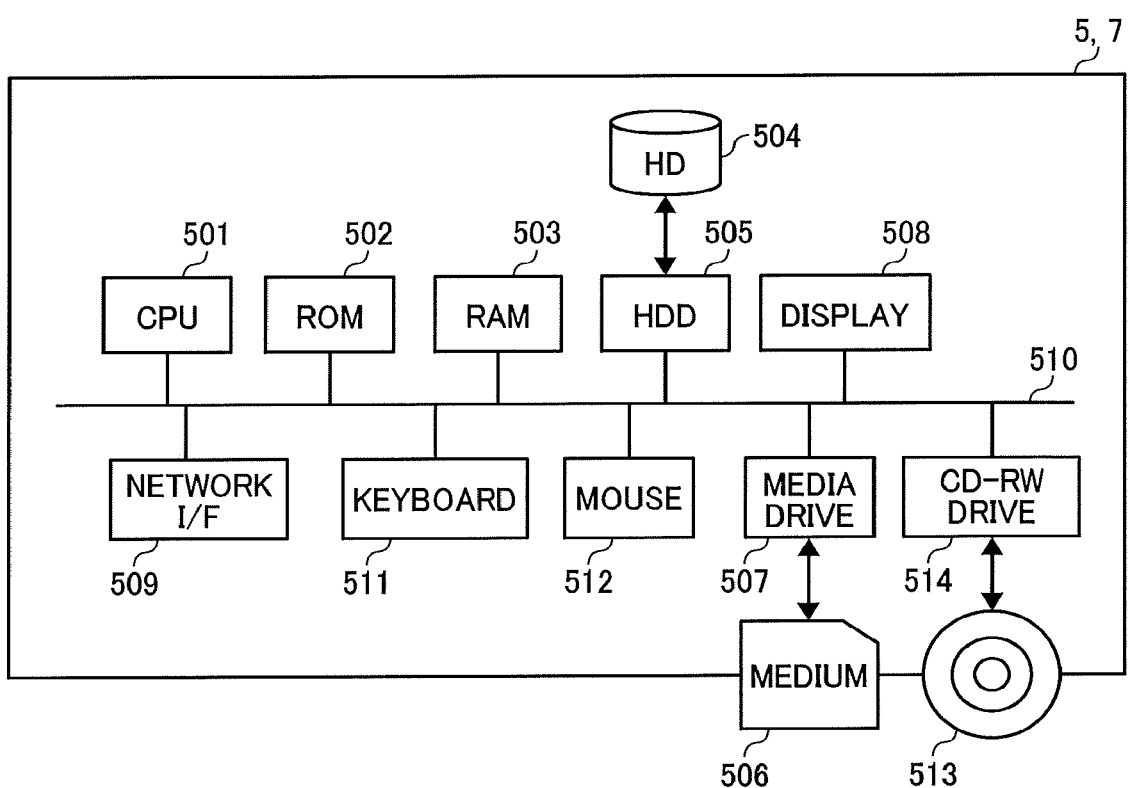
FIG. 11 is a block diagram illustrating an example of a hardware configuration of any one of a communication management system and a personal computer (PC), according to an embodiment of the present disclosure.

FIG. 11 is a block diagram illustrating an example of a hardware configuration of any one of the communication management system 5 and the PC 7, according to an embodiment of the present disclosure. In this example, both the communication management system 5 and the PC 7 are implemented by a computer. Therefore, a description is given of a configuration of the communication management system 5, and the description of a configuration of the PC 7 is omitted, having the same or substantially the same configuration as that of the communication management system 5.

The communication management system 5 includes a CPU 501 that controls entire operation of the communication management system 5, a ROM 502 that stores programs such as an IPL to boot the CPU 501, and a RAM 503, which is used as a work area for the CPU 501. The communication management system 5 further includes a hard disc (HD) 504 that stores various data such as programs used by the communication management system 5, and an HDD 505 that controls reading and writing of data from and to the HD 504 under control of the CPU 501. The communication management system 5 further includes a media drive 507 that controls reading and writing (storing) of data from and to a storage medium 506 such as a flash memory, a display 508 that displays various information such as a cursor, menus, windows, characters, or images, and a network I/F 509 that enables communication of data with an external device through the communication network 100. The communication management system 5 further includes a keyboard 511 that includes a plurality of keys to allow a user to input characters, numbers, and various instructions, and a mouse 512 that allows a user to input an instruction for selecting and executing various functions, selecting an item to be processed, or moving the cursor. The communication management system 5 further includes a compact disc rewritable (CD-RW) drive (or CD-ROM drive) 514 that controls reading and writing of data from and to a removable storage medium 513 such as a CD-ROM or a CD-RW, and a bus line 510 that electrically connects these hardware components to one another. Examples of the bus line 510 include an address bus and a data bus.

<Example of Hardware Configuration of Smartphone 9>

Hereinafter, a description is given of an example of a hardware configuration of the smartphone 9, with reference to FIG. 12.

Figure 12:
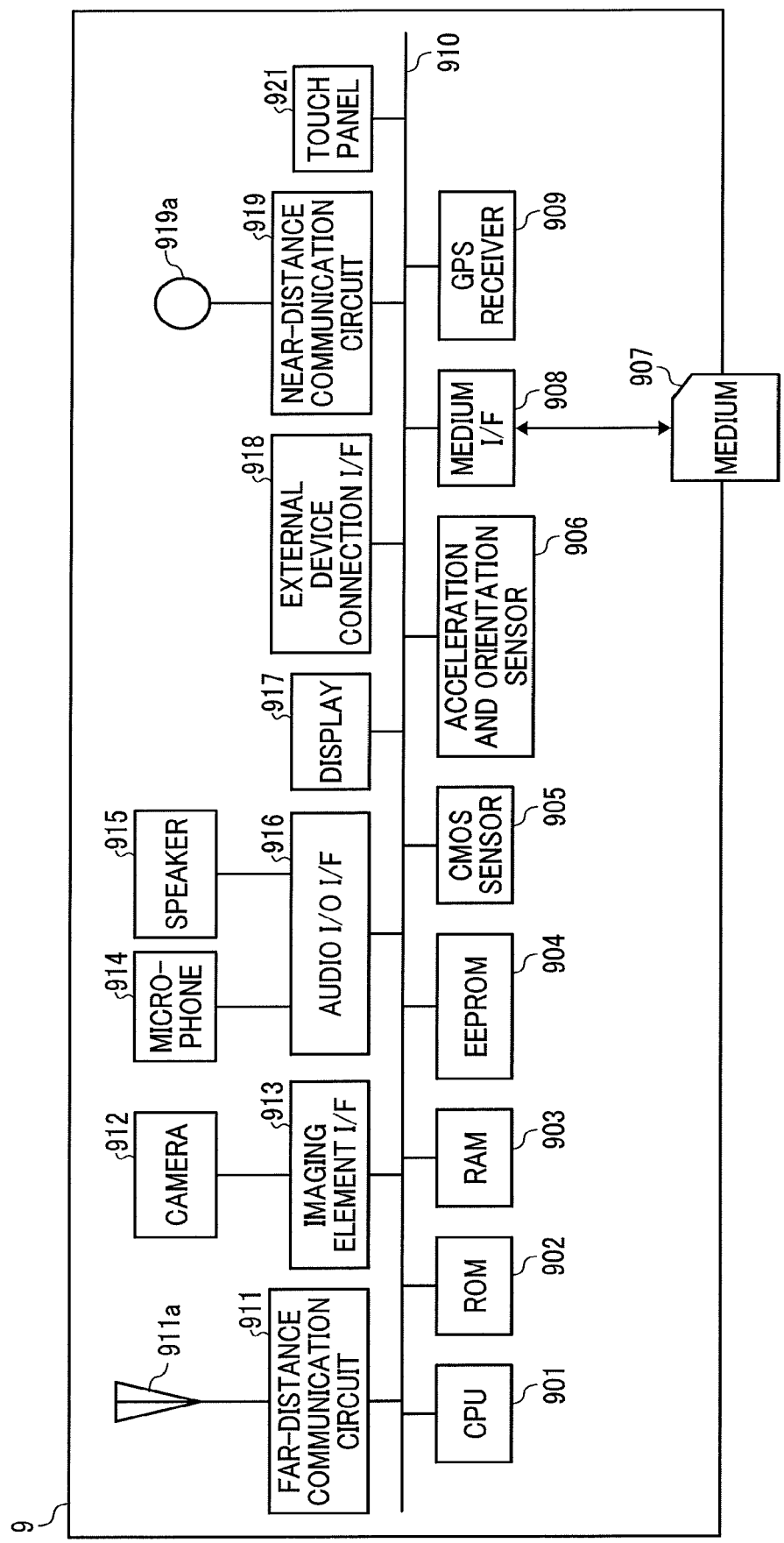
FIG. 12 is a block diagram illustrating an example of a hardware configuration of a smartphone, according to an embodiment of the present disclosure.

FIG. 12 is a block diagram illustrating an example of a hardware configuration of the smartphone 9, according to an embodiment of the present disclosure. As illustrated in the drawing, the smartphone 9 includes a CPU 901, a ROM 902, a RAM 903, an EEPROM 904, a CMOS sensor 905, an acceleration and orientation sensor 906, a medium I/F 908, and a global positioning system (GPS) receiver 909.

The CPU 901 controls an entire operation of the smartphone 9. The ROM 902 stores program such as an IPL. The RAM 903 is used as a work area for the CPU 901. The EEPROM 904 reads or writes various data such as a control program for a smartphone under control of the CPU 901.

The CMOS sensor 905 captures a subject (mainly, a user operating the smartphone 9) under control of the CPU 901 to obtain image data. The acceleration and orientation sensor 906 is, for example, an electromagnetic compass for detecting geomagnetism, a gyrocompass, or an acceleration sensor. The medium I/F 908 controls reading or writing of data from and to a storage medium 907 such as a flash memory. The GPS receiver 909 receives GPS signals from a GPS satellite.

The smartphone 9 further includes a far-distance communication circuit 911, a camera 912, an imaging element I/F 913, a microphone 914, a speaker 915, an audio input/output interface 916, a display 917, an external device connection I/F 918, a near-distance communication circuit 919, an antenna 911a for the far-distance communication circuit 911, an antenna 919a for the near-distance communication circuit 919, and a touch panel 921.

The far-distance communication circuit 911 is a circuit that communicates with an external apparatus through the communication network 100. The camera 912 is an example of a built-in imaging device capable of capturing a subject under control of the CPU 901 to obtain image data. The imaging element I/F 913 is a circuit that controls the camera 912. The microphone 914 is an example of a built-in audio collecting device capable of inputting audio.

The audio input/output interface 916 is a circuit for controlling input and output of audio signals between the microphone 914 and the speaker 915 under control of the CPU 901. The display 917 is an output device that displays an image of a subject, various icons, or the like. For example, the display 917 is a device constituted as a liquid crystal or organic electroluminescence (EL) display. The external device connection I/F 918 is an interface circuit that connects the smartphone 9 to an external device.

The near-distance communication circuit 919 is a communication circuit that communicates in compliance with the NFC, the Bluetooth and the like. The touch panel 921 is an example of an input device that enables a user to input a user instruction to the smartphone 9 through touching a screen of the display 917.

The smartphone 9 further includes a bus line 910. Examples of the bus line 910 include an address bus and a data bus, which electrically connects the hardware components to one another.

It should be noted that a storage medium such as a CD-ROM or a hard disc storing any one of the above-described programs may be distributed domestically or overseas as a program product.

<Example of Functional Configuration>

Hereinafter, referring to FIG. 13 and FIG. 14, a description is given of an example of a function configuration of the image communication system.

Figure 13:
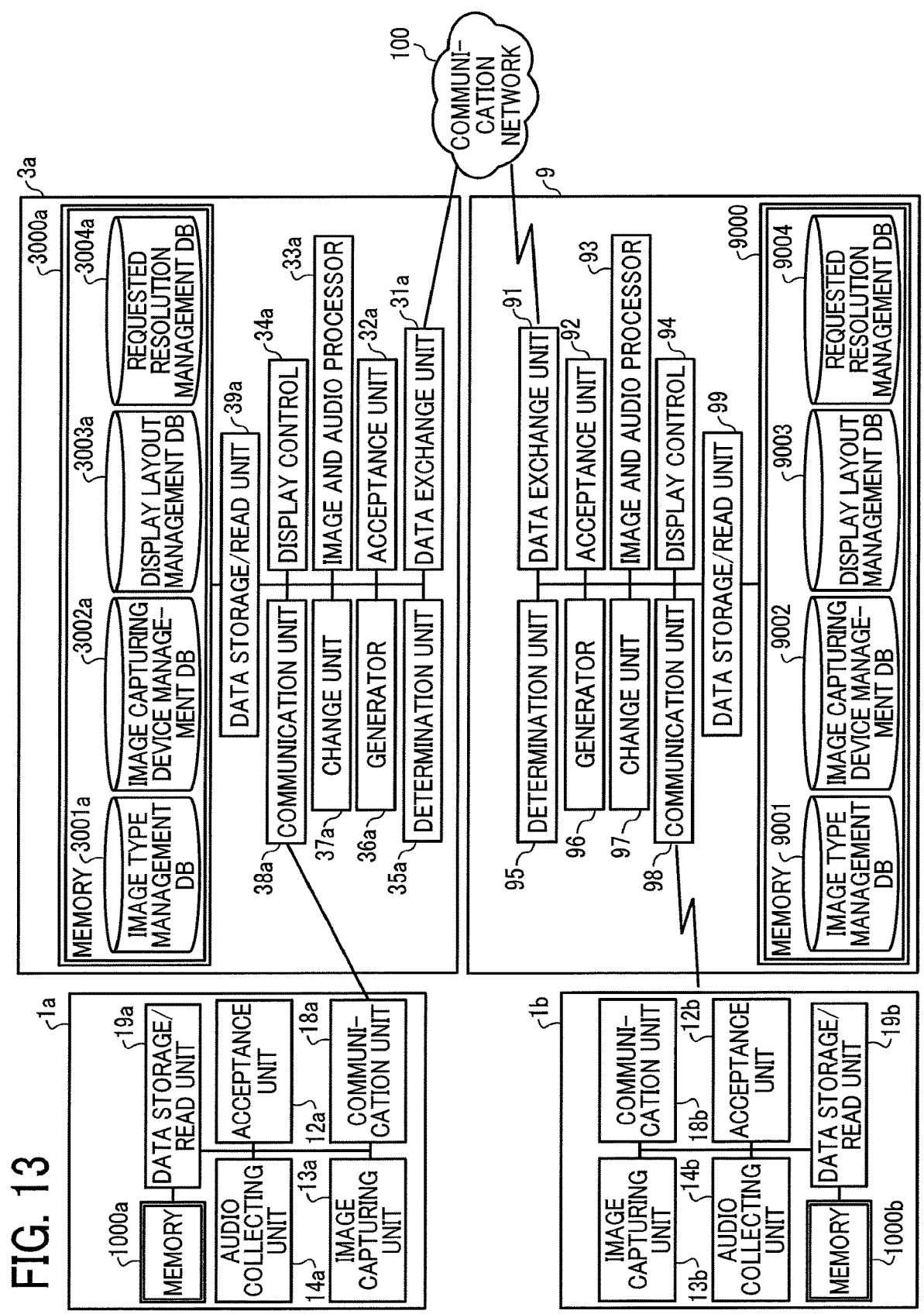
FIG. 13 is a block diagram illustrating an example of a part of a functional configuration of the image communication system according to an embodiment of the present disclosure.
Figure 14:
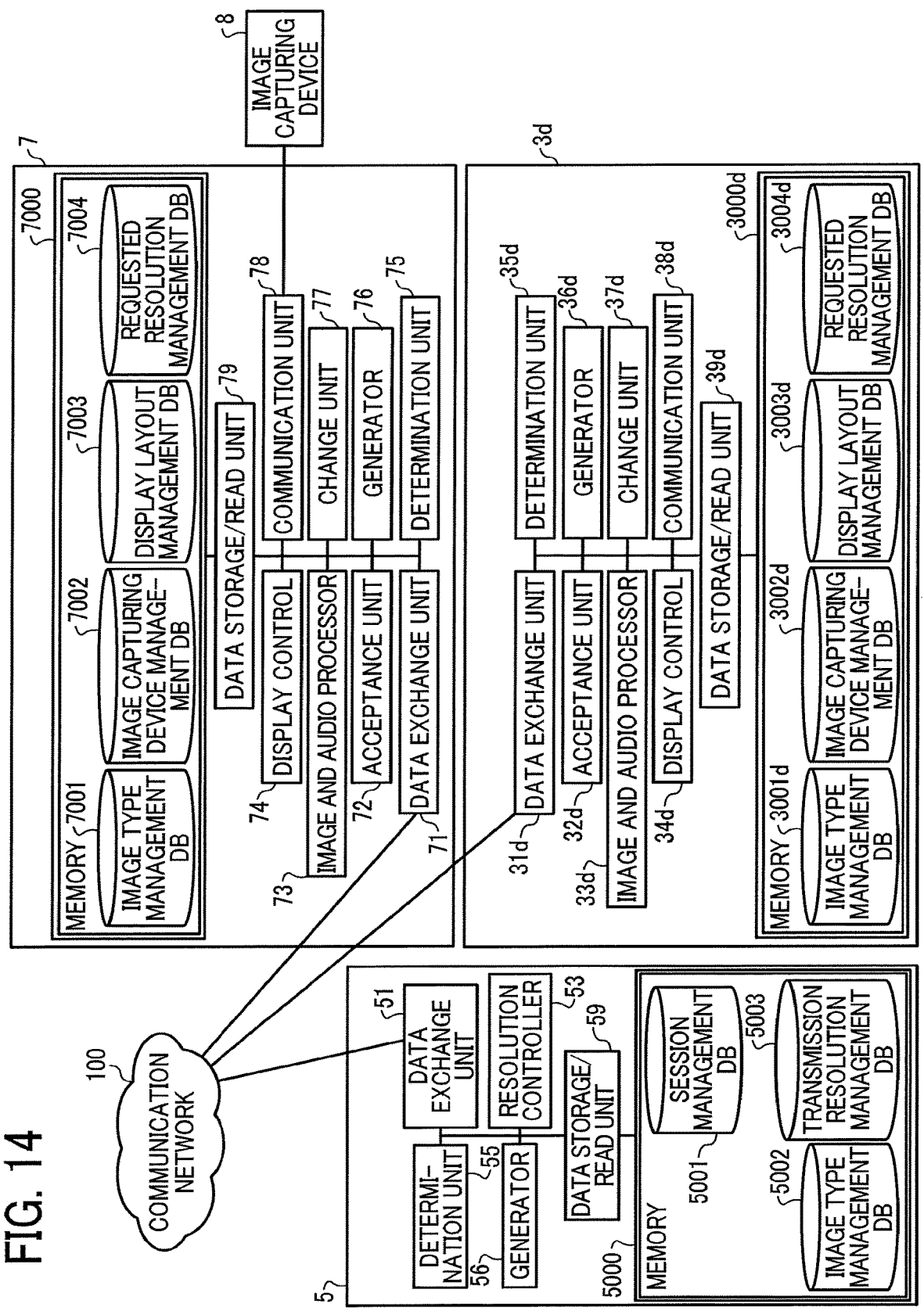
FIG. 14 is a block diagram illustrating an example of a part of a functional configuration of the image communication system according to an embodiment of the present disclosure.

FIG. 13 and FIG. 14 are block diagrams, illustrating an example of a functional configuration of the image communication system according to an embodiment of the present disclosure.

<Example of Functional Configuration of Image Capturing Device 1a>

As illustrated in FIG. 13, the image capturing device 1a includes an acceptance unit 12a, an image capturing unit 13a, an audio collecting unit 14a, a communication unit 18a, and a data storage/read unit 19a. These units are functions or means that are implemented by or that are caused to function by operating any of the elements illustrated in FIG. 9 in cooperation with the instructions of the CPU 111 according to a program.

The image capturing device 1a further includes a memory 1000a, which is implemented by the ROM 112, the SRAM 113, and the DRAM 114 illustrated in FIG. 9. The memory 1000a stores data such as a globally unique identifier (GUID) identifying the own device (i.e., the image capturing device 1a).

The image capturing device 1b includes an acceptance unit 12b, an image capturing unit 13b, an audio collecting unit 14b, a communication unit 18b, a data storage/read unit 19b, and a memory 1000b, in substantially the same manner as the image capturing device 1a. These functional units of the image capturing device 1b implement the similar or substantially the similar functions as those of the acceptance unit 12a, the image capturing unit 13a, the audio collecting unit 14a, the communication unit 18a, the data storage/read unit 19a, and the memory 1000 of the image capturing device 1a, respectively. Therefore, redundant descriptions thereof are omitted below.

(Example of Function of Image Capturing Device 1a)

Hereinafter, referring to FIG. 9 and FIG. 13, a further detailed description is given of each functional unit of the image capturing device 1a according to the embodiment.

The acceptance unit 12a is implemented by the operation unit 115 illustrated in FIG. 9, when operating under control of the CPU Ill. The acceptance unit 12a accepts an instruction input from the operation unit 115 according to a user operation.

The image capturing unit 13a is implemented by the imaging unit 101, the image processing unit 104, and the imaging control unit 105, illustrated in FIG. 9, when operating under control of the CPU 111. For example, the image capturing unit 13a captures an image of a subject or surroundings to obtain captured-image data.

The audio collecting unit 14a is implemented by the microphone 108 and the audio processing unit 109 illustrated in FIG. 9, when operating under control of the CPU 111. The audio collecting unit 14a collects sounds around the image capturing device a.

The communication unit 18a is implemented by instructions of the CPU 111. For example, the communication unit 18a communicates data with a communication unit 38 of the videoconference terminal 3a using the near-distance wireless communication technology in compliance with such as NFC, Bluetooth (registered trademark), or Wi-Fi (registered trademark).

The data storage/read unit 19a is implemented by instructions of the CPU 111 illustrated in FIG. 9. The data storage/read unit 19a stores data or information in the memory 1000a or reads out data or information from the memory 1000a.

<Example of Functional Configuration of Videoconference Terminal 3a>

As illustrated in FIG. 13, the videoconference terminal 3a includes a data exchange unit 31a, an acceptance unit 32a, an image and audio processor 33a, a display control 34a, a determination unit 35a, a generator 36a, a change unit 37a, a communication unit 38a, and a data storage/read unit 39a. These units are functions that are implemented by or that are caused to function by operating any of the elements illustrated in FIG. 10 in cooperation with the instructions of the CPU 301 according to a program.

The videoconference terminal 3a further includes a memory 3000a, which is implemented by the ROM 302, the RAM 303, and the flash memory 304 illustrated in FIG. 10. For example, the memory 3000a stores an image type management DB 3001a, an image capturing device management DB 3002a, a display layout management DB 3003a, and a required resolution management DB 3004a.

Among these DBs, the image type management DB 3001a is implemented by an image type management table having an example data structure as illustrated in Table 1 below

TABLE 1

| IMAGE DATA ID | IP ADDRESS OF SENDER TERMINAL | SOURCE NAME (IMAGE TYPE INFORMATION) |
|---|---|---|
| RS001 | 1.2.1.3 | Video_Theta |
| RS002 | 1.2.2.3 | Video_Theta |
| RS003 | 1.3.1.3 | Video |
| RS004 | 1.3.2.3 | Video |

The image capturing device management DB 3002a is implemented by an image capturing device management table having an example data structure as illustrated in Table 2 below.

TABLE 2

VENDOR ID AND PRODUCT ID OF GUID OF
IMAGE CAPTURING DEVICE vid_05ca & pid_2711
vid_05ca & pid_3822
. . .

The display layout management DB 3003*a* is implemented by a display layout management table having an example data structure as illustrated in Table 3 below.

TABLE 3

| LAYOUT NUMBER | IMAGE DATA ID | DISPLAY SIZE |
|---|---|---|
| 1 | RS003 | 320 × 180 |
| 2 | RS002 | 160 × 90 |
| 3 | RS004 | 160 × 90 |
| 4 | RS001 | 160 × 90 | the display layout management DBs at the other sites are implemented by display layout management tables having example data structures as illustrated in Table 4, Table 5 and Table 6 below.

TABLE 4

| LAYOUT NUMBER | IMAGE DATA ID | DISPLAY SIZE |
|---|---|---|
| 1 | RS001 | 640 × 480 |
| 2 | RS003 | 320 × 180 |
| 3 | RS004 | 320 × 180 |
| 4 | RS002 | 320 × 180 |

TABLE 5

| LAYOUT NUMBER | IMAGE DATA ID | DISPLAY SIZE |
|---|---|---|
| 1 | RS001 | 320 × 180 |
| 2 | RS002 | 160 × 90 |
| 3 | RS004 | 160 × 90 |
| 4 | RS003 | 160 × 90 |

TABLE 6

| LAYOUT NUMBER | IMAGE DATA ID | DISPLAY SIZE |
|---|---|---|
| 1 | RS001 | 640 × 480 |
| 2 | RS002 | 320 × 180 |
| 3 | RS003 | 320 × 180 |
| 4 | RS004 | 320 × 180 |

The required resolution management DB 3004*a* is implemented by a required resolution management table having example data structures as illustrated in Table 7 and Table 8 below.

TABLE 7

IMAGE TYPE INFORMATION: Video_Theta

| DISPLAY SIZE | REQUIRED RESOLUTION |
|---|---|
| 640 × 480 | 1280 × 720 |
| 320 × 180 | 640 × 480 |
| 160 × 90 | 352 × 288 |

TABLE 8

IMAGE TYPE INFORMATION: Video

| DISPLAY SIZE | REQUIRED RESOLUTION |
|---|---|
| 640 × 480 | 640 × 480 |
| 320 × 180 | 352 × 288 |
| 160 × 90 | 176 × 144 |

The videoconference terminal 3*d* includes a data exchange unit 31*d*, an acceptance unit 32*d*, an image and audio processor 33*d*, a display control 34*d*, a determination unit 35*d*, a generator 36*d*, a change unit 37*d*, a communication unit 38*d*, and a data storage/read unit 39*d*, and a memory 3000*d*. These functional units of the videoconference terminal 3*d* implement the similar or substantially the similar functions as those of the data exchange unit 31*a*, the acceptance unit 32*a*, the image and audio processor 33*a*, the display control 34*a*, the determination unit 35*a*, the generator 36*a*, the change unit 37*a*, the communication unit 38*a*, the data storage/read unit 39*a*, and the memory 3000*a* of the videoconference terminal 3*a*, respectively. Therefore, redundant descriptions thereof are omitted below.

In addition, the memory 3000*d* of the videoconference terminal 3*d* stores an image type management DB 3001*d*, and an image capturing device management DB 3002*d*, a display layout management DB 3003*d*, and a required resolution management DB 3004*d*. These DBs 3001*d*, 3002*d*, 3003*d* and 3004*d* have the same or the substantially the same data structure as the image type management DB 3001*a*, the image capturing device management DB 3002*a*, the display layout management DB 3003*a*, and the required resolution management DB 3004*a* of the videoconference terminal 3*a*, respectively. Therefore, redundant descriptions thereof are omitted below.

(Example of Image Type Management Table)

The above Table 1 is an example of the image type management table. The image type management table of Table 1 stores an image data identifier (ID), an IP address, which is an example of an address of a sender terminal, and a source name, in association with one another.

The image data ID is one example of image data identification information to be used in video communication, for identifying image data. An Identical image data ID is assigned to image data transmitted from the same sender terminal. Accordingly, based on the image data ID, a destination terminal (that is, a communication terminal that receives image data) can identify which terminal (sender terminal) has transmitted the received image data.

The IP address of the sender terminal, which is associated with an specific image data ID, indicates an IP address of a communication terminal that is identified by that image data ID, i.e., of a communication terminal that transmits image data identified by that image data ID.

The source name, which is associated with specific image data ID, is a name for identifying an image capturing device that outputs image data identified by that image data ID. The source name is one example of image type information. In this example, this source name is a name created by each communication terminal such as the videoconference terminal 3*a* according to a predetermined naming rule.

The example of the image type management table illustrated in Table 1 indicates that four communication terminals, whose IP addresses are respectively "1.2.1.3", "1.223", "1.3.1.3", and "1.3.2.3" transmit image data identified by the image data ID "RS001", "RS002", "RS003", and "RS004", respectively.

Further, according to an example of the image type management table illustrated in Table 1, the image type identified by the source names includes "Video_Theta" and "Video". "Video_Theta" is an example indicating that the image type is a "special image". "Video" is an example Indicating that the image type is a "general image". In this example, the special image is a full spherical panoramic image.

In another example, information regarding data other than the image data may be stored in the image type management table in association with the image data ID. Examples of the data other than the image data include audio data and presentation material data.

(Example of Image Capturing Device Management Table)

The above Table 2 is an example of the image capturing device management table. In the image capturing device management table illustrated in Table 2, an image capturing device is managed by a vendor ID (VID) and a product ID (PID).

In other words, a GUID is, for example, a combination of the VID and the PID used in the USB device. For example, those vendor ID and product ID are stored in the image capturing device before shipment. In another example, those IDs may be stored in the image capturing device after shipment.

(Example of Display Layout Management Table)

The above Tables 3 to 6 are examples of the display layout management tables. Table 3 illustrates an example of a data structure of the display layout management DB 3003a (FIG. 13) included in the videoconference terminal 3a.

Table 4 illustrates an example of a data structure of the display layout management DB 9003 (FIG. 13) included in the smartphone 9.

Table 5 illustrates an example of a data structure of the display layout management DB 7003 (FIG. 14) included in the PC 7.

Table 6 illustrates an example of a data structure of the display layout management DB 3003d (FIG. 14) included in the videoconference terminal 3d.

In the display layout management table as illustrated in Table 3, a layout number is a number that is capable of identifying one display area from among a plurality of display areas on the display 4a.

In each display area, an image is displayed based on the layout. An image to be displayed in each display area is identified based on the image data ID. Furthermore, a display size indicating a size for displaying an image in each display area is stored in association with the layout number and the image ID. In Table 3, the number of pixels in horizontal and vertical directions is stored as the display size.

Figure 22:
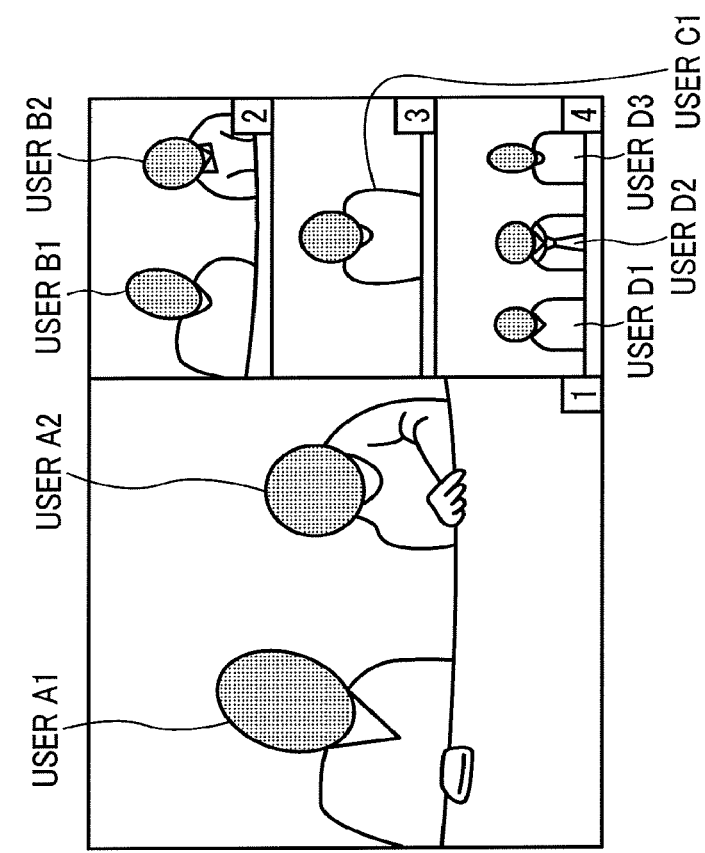
FIG. 22 is a view illustrating a display example of two hemispherical images according to an embodiment of the present disclosure.
Figure 23:
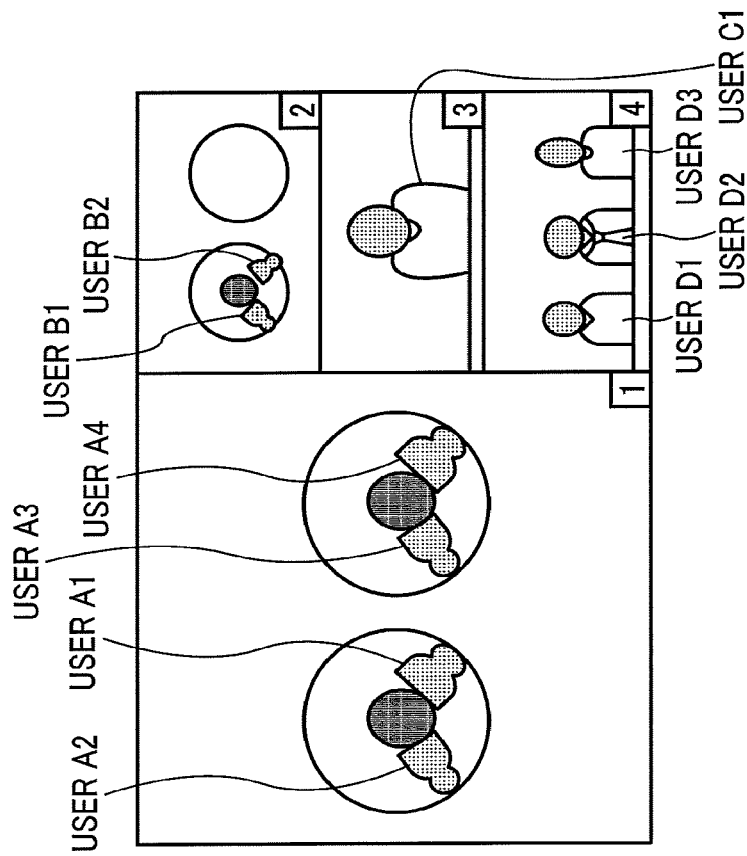
FIG. 23 is a view illustrating a display example of a predetermined-area image according to an embodiment of the present disclosure.

In examples below, the layout number is displayed at the lower right corner of each display area, as illustrated in FIG. 22 and FIG. 23. Further, in a configuration as illustrated in FIG. 8, for example, the display size is determined by being obtained by the videoconference terminal 3a from the display 4a Accordingly, when the display 4a to be used is changed, the display size in the display layout management table is also changed.

In addition, when images to be displayed in the display areas are changed (switched), the image data IDs in the display layout management table are also changed (switched). As an example of this change (switch), in an example of FIG. 23, when the user B1 (FIG. 8) starts to speak, a change is made so that an image of the site B that was displayed in a display area "2" is displayed in a display area "1". On the other hand, a change is made so that an image of the site A that was displayed in the display area "1" is displayed in the display area "2". This change is performed by the change unit 37a based on audio data and the image data ID.

(Example of Required Resolution Management Table)

The above Table 7 and Table 8 are examples of the required resolution management tables for the different image types. As illustrated in Table 7 and Table 8, the required resolution management tables are generated for respective ones of the image type information indicating the different image types. In each of the required resolution management table, the display size (number of pixels in horizontal and vertical directions) by which an image is displayed in each of the display areas is stored. In addition, the required resolution management table stores a required resolution (number of pixels in the horizontal and vertical directions) of image data to be required for the communication management system 5 in association with the display size.

Table 7 is an example of the required resolution management table for the "special image" as the image type information. By contrast, Table 8 is an example of the required resolution management table for the "general image" as the image type information.

In an example of Table 7 and Table 8, for the same display size (for example, 640×480 pixels), the required resolution for the "general image" Is 640×480 pixels, while the required resolution for the "special image" is 1280×720 pixels.

In other words, even for the same display size, the required resolution for the special image is higher than the required resolution for the general image. This prevents an image representing one site displayed on a display at a different site from getting not suitable for viewing due to the resolution, even when an image (predetermined-area image) representing a predetermined area T as illustrated FIG. 6A is displayed on the display at the different site as illustrated in FIG. 6B.

(Example of Functional Configuration of Videoconference Terminal 3a)

Hereinafter, referring to FIG. 10 and FIG. 13, a description is given of an example of a functional configuration of the videoconference terminal 3a.

The data exchange unit 31a of the videoconference terminal 3a is implemented by the network I/F 311 illustrated in FIG. 10, when operating under control of the CPU 301. The data exchange unit 31a exchanges data or information with communication management system 5 via the communication network 100.

The acceptance unit 32a is implemented by the operation key 308 (FIG. 10), when operating under control of the CPU 301. The acceptance unit 32a receives an instruction input from the operation key 308 according to a user operation. The acceptance unit 32a may be implement by other input device such as a touch panel, as an alternative to or in place of the operation key 308.

The image and audio processor 33a is implemented by instructions of the CPU 301. The image and audio processor 33a processes image data that is obtained by capturing a subject by the camera 312 (FIG. 10). Further, when the voice of a user is converted into audio signals by the microphone 314 (FIG. 10), the image and audio processor 33a processes audio data indicating the voice.

Further, the image and audio processor 33a processes image data received from other communication terminal based on the image type information such as the source name, to enable the display control 34 to control the display 4 to display an image based on the processed image data.

More specifically, when an image is the special image, the image and audio processor 33a generates image data indicating a full spherical panoramic image as illustrated in FIG. 4B based on based on image data (e.g., image data indicating hemispherical images as illustrated in FIGS. 3A and 3B). Further, the image and audio processor 33a generates a predetermined-area image as illustrated in FIG. 6B.

Furthermore, the image and audio processor 33a controls the speaker 315 (FIG. 10) to output sound based on audio data received from an external apparatus via the communication management system 5.

The display control 34a is implemented by the display I/F 317, when operating under control of the CPU 301. The display control 34a controls the display 4 to display images or characters.

The determination unit 35a is implemented by instructions of the CPU 301. For example, the determination unit 35a determines an image type of image data received from the image capturing device 1a.

The generator 36a is implemented by instructions of the CPU 301. The generator 36a generates a source name according to the above-described naming rule, based on a determination result generated by the determination unit 35a indicating a "general image" or a "special image" (that is, full spherical panoramic image in this example). For example, when the determination unit 35a determines the image type as a "general image", the generator 36a generates the source name "Video" indicating a "general image". By contrast, when the determination unit 35a determines the image type as a "special image", the generator 36a generates the source name "Video_Theta" indicating a "special image".

The change unit 37a is implemented by instruction of the CPU 301. The change unit 37a changes (switches) association of a layout number with an image data ID in the display layout management table. For example, the change unit 37a changes a layout number that is associated an image data ID transmitted from a site where a user who spoke immediately before is present to "1". More specifically, the change unit 37a replaces an image data ID that was associated with the layout number "1" with the image data ID transmitted from the site where a user who spoke immediately before is present. With this process, an image according to image data indicating the site where a user who spoke immediately before is present is displayed the largest, as illustrated in FIG. 23.

The communication unit 38a is implemented by the near-distance communication circuit 319 and the antenna 319a, when operating under control of the CPU 301. The communication unit 38a communicates with the communication unit 18a of the image capturing device 1a using the near-distance communication technology in compliance with such as NFC, Bluetooth (registered trademark), or Wi-Fi (registered trademark). Although in the above description, the communication unit 38a and the data exchange unit 31a have separate communication units, alternatively a shared communication unit may be used.

The data storage/read unit 39a is implemented by instructions of the CPU 301. The data storage/read unit 39a stores data or information in the memory 3000a or reads out data or information from the memory 3000a.

<Example of Functional Configuration of Communication Management System 5>

Hereinafter, referring to FIG. 11 and FIG. 14, a description is given of each functional unit of the communication management system 5. The communication management system 5 includes a data exchange unit 51, a resolution controller 53, a determination unit 55, a generator 56, and a data storage/read unit 59. These units are functions that are implemented by or that are caused to function by operating any of the elements illustrated in FIG. 11 in cooperation with the instructions of the CPU 501 according to a program.

The communication management system 5 further includes a memory 5000, which is implemented by the RAM 503 and the HD 504 (FIG. 1). The memory 5000 stores a session management DB 5001, an image type management DB 5002, and a transmission resolution management DB 5003.

The session management DB 5001 is implemented by a session management table having an example data structure as illustrated in Table 9 below.

TABLE 9

| SESSION ID | IP ADDRESS OF PARTICIPATING TERMINAL |
|---|---|
| se101 | 1.2.1.3, 1.2.2.3, 1.3.1.3 |
| se102 | 1.2.1.3, 1.2.2.3, 1.3.1.3 |
| ... | ... |

The image type management DB 5002 is implemented by an image type management table having an example data structure as illustrated in Table 10 below.

TABLE 10

| SESSION ID | IMAGE DATA ID | IP ADDRESS OF SENDER TERMINAL | SOURCE NAME (IMAGE TYPE INFORMATION) |
|---|---|---|---|
| se101 | RS001 | 1.2.1.3 | Video_Theta |
| se101 | RS002 | 1.2.2.3 | Video |
| se101 | RS003 | 1.3.1.3 | Video_Theta |
| se102 | RS004 | 1.2.1.4 | Video |
| se102 | RS005 | 1.3.1.4 | Video_Theta |
| ... | ... | ... | ... |

The transmission resolution management DB 5003 is implemented by a transmission resolution management table having an example data structure as illustrated in Table 11 below.

TABLE 11

| | IP ADDRESS OF SITE A | IP ADDRESS OF SITE B | IP ADDRESS OF SITE C | IP ADDRESS OF SITE D |
|---|---|---|---|---|
| IP ADDRESS OF SITE A | | 320 × 180 | 320 × 180 | 160 × 90 |
| IP ADDRESS OF SITE B | 1280 × 720 | | 320 × 180 | 320 × 180 |
| IP ADDRESS OF SITE C | 640 × 480 | 320 × 180 | | 160 × 90 |
| IP ADDRESS OF SITE D | 1280 × 720 | 640 × 480 | 320 × 180 | |

(Example of Session Management Table)

The above Table 9 is an example of the session management table. In this example, the session management table stores a session ID and an IP address of participating communication terminal, in association with each other. The session ID is one example of session identification information for identifying a session that implements video calling. For example, the session ID is generated for each virtual conference room. The session ID is also stored in each communication terminal such as the videoconference terminal 3a Each communication terminal selects a desired session ID from the session ID or IDs stored therein.

In the above Table 9, the IP address of participating communication terminal indicates an IP address of the communication terminal participating in a virtual conference room identified by the session ID.

(Example of Image Type Management Table)

The above Table 10 is an example of the image type management table. The image type management table as illustrated in Table 10 stores, in addition to the information items stored in the image type management table as illustrated in Table 1, the session ID stored in the session management table as illustrated in Table 9, in association with one another. This example of the image type management table indicates that three communication terminals whose IP addresses are respectively "1.2.1.3", "1.2.2.3", and "13.13" are participating in the virtual conference room identified by the session ID "se101".

In the communication management system 5, the communication to stores the same image data ID, IP address of the sender terminal, and image type information as those stored in a communication terminal such as the videoconference terminal 3a. This enables the communication management system 5 to transmit information such as the image type information to both a communication terminal that is already in video calling and a newly participating communication terminal that enters the virtual conference room after the video calling has started. Accordingly, the communication terminal that is already in the video calling and the newly participating communication terminal do not have to exchange such information as the image type information with each other.

(Example of Transmission Resolution Management Table)

The above Table 11 is an example of the transmission resolution management table. In this example, the transmission resolution management table manages, in a column direction, the IP addresses of the communication terminals, each being a destination to which image data is transmitted (in other words, a resolution request sender terminal of the required resolution). Further, in this example, the transmission resolution management table manages, in a row direction, the IP addresses of the communication terminals, each being a sender terminal from which image data is transmitted.

Based on this table, when relaying image data received from the site A (videoconference terminal 3a) to the site D (videoconference terminal 3d) for example, the communication management system 5 transmits the image data having the resolution of 1280×720 pixels to the site D.

(Example of Functional Configuration of Communication Management System 5) Hereinafter, referring to FIG. 11 and FIG. 13, a description is given of each functional unit of the communication management system 5.

The data exchange unit 51 of the communication management system 5 is implemented by the network I/F 509, when operating under control of the CPU 501 (FIG. 1). The data exchange unit 51 exchanges data or information with an external apparatus such as the videoconference terminal 3a, the videoconference terminal 3d, or the PC 7 via the communication network 100.

The resolution controller 53 is implemented by instructions of the CPU 501 (FIG. 11). For example, the resolution controller 53 controls (e.g., changes) the resolution of image data transmitted from one communication terminal, based on the transmission resolution management DB 5003.

The determination unit 55, which is implemented by instructions of the CPU 501, performs various determinations.

The generator 56 is implemented by instructions of the CPU 501. For example, the generator 56 generates the image data ID.

The data storage/read unit 59 is implemented by the HDD 505 (FIG. 1), when operating under control of the CPU 501. For example, the data storage/read unit 59 stores data or information in the memory 5000 or reads out data or information from the memory 5000.

<Example of Functional Configuration of PC 7>

Hereinafter, referring to FIG. 1I and FIG. 13, a description is given of a functional configuration of the PC 7. For example, the PC 7 has the same or substantially the same functional configuration as that of the videoconference terminal 3a. In other words, as illustrated in FIG. 13, the PC 7 includes a data exchange unit 71, an acceptance unit 72, an image and audio processor 73, a display control 74, a determination unit 75, a generator 76, a change unit 77, a communication unit 78, and a data storage/read unit 79. These units are functions that are implemented by or that are caused to function by operating any of the elements illustrated in FIG. 11 in cooperation with the instructions of the CPU 501 according to a program.

The PC 7 further includes a memory 7000, which is implemented by the ROM 502, the RAM 503 and the HD 504 (FIG. 11). For example, the memory 7000 stores an image type management DB 7001, an image capturing device management DB 7002, a display layout management DB 7003, and a required resolution management DB 7004. These DBs 7001, 7002, 7003 and 7004 have the same or the substantially the same data structure as the image type management DB 3001a, the image capturing device management DB 3002a, the display layout management DB 3003a, and the required resolution management DB 3004a, respectively. Therefore, redundant descriptions thereof are omitted below.

(Example of Functional Configuration of PC 7)

The data exchange unit 71 of the PC 7 is implemented by the network I/F 509, when operating under control of the CPU 501 (FIG. 11). The data exchange unit 71 implements the similar or substantially the similar function to that of the data exchange unit 31a.

The acceptance unit 72 is implemented by the keyboard 511 and the mouse 512, when operating under control of the CPU 501 (FIG. 11). The acceptance unit 72 implements the similar or substantially the similar function to that of the acceptance unit 32a.

The image and audio processor 73 is implemented by instructions of the CPU 501 (FIG. 11). The image and audio processor 73 implements the similar or substantially the similar function to that of the image and audio processor 33a.

The display control 74 is implemented by instructions of the CPU 501. The display control 74 implements the similar or substantially the similar function to that of the display control 34a.

The determination unit 75 is implemented by instructions of the CPU 501. The determination unit 75 implements the similar or substantially the similar function to that of the determination unit 35a.

The generator 76 is implemented by instructions of the CPU 501. The generator 76 implements the similar or substantially the similar function to that of the generator 36a.

The change unit 77 is implemented by instructions of the CPU 501. The change unit 77 implements the similar or substantially the similar function to that of the change unit 37a.

The communication unit 78 is implemented by instructions of the CPU 501. The communication unit 78 implements the similar or substantially the similar function to that of the communication unit 38a.

The data storage/read unit 79 is implemented by instructions of the CPU 501. The data storage/read unit 79 stores data or information in the memory 7000 or reads out data or information from the memory 7000.

<Example of Functional Configuration of Smartphone 9>

Hereinafter, referring to FIG. 12 and FIG. 13, a description is given of a functional configuration of the smartphone 9. For example, the smartphone 9 has the same or substantially the same functions as those of the videoconference terminal 3a. In other words, as illustrated in FIG. 13, the smartphone 9 includes a data exchange unit 91, an acceptance unit 92, an image and audio processor 93, a display control 94, a determination unit 95, a generator 96, a change unit 97, a communication unit 98, and a data storage/read unit 99. These units are functions that are implemented by or that are caused to function by operating any of the elements illustrated in FIG. 12 in cooperation with the instructions of the CPU 901 according to a program.

The smartphone 9 further includes a memory 9000, which is implemented by the ROM 902, the RAM 903, and the EEPROM 904 (FIG. 12). For example, the memory 9000 stores an image type management DB 9001, an image capturing device management DB 9002, a display layout management DB 9003, and a required resolution management DB 9004. These DBs 9001, 9002, 9003 and 9004 have the same or the substantially the same data structure as the image type management DB 3001a, the image capturing device management DB 3002a, the display layout management DB 3003a, and the required resolution management DB 3004a, respectively. Therefore, redundant descriptions thereof are omitted below.

(Example of Functional Configuration of Smartphone 9)

The data exchange unit 91 of the smartphone 9 is implemented by the far-distance communication circuit 911, when operating under control of the CPU 901 (FIG. 12). The data exchange unit 91 implements the similar or substantially the similar function to that of the data exchange unit 31a.

The acceptance unit 92 is implemented by the touch panel 921, when operating under control of the CPU 901. The acceptance unit 92 implements the similar or substantially the similar function to that of the acceptance unit 32a.

The image and audio processor 93 is implemented by instructions of the CPU 901. The image and audio processor 93 implements the similar or substantially the similar function to that of the image and audio processor 33a.

The display control 94 is implemented by instructions of the CPU 901. The display control 94 implements the similar or substantially the similar function to that of the display control 34a.

The determination unit 95 is implemented by instructions of the CPU 901. The determination unit 95 implements the similar or substantially the similar function to that of the determination unit 35a.

The generator 96 is implemented by instructions of the CPU 901. The generator 96 implements the similar or substantially the similar function to that of the generator 36a.

The change unit 97 is implemented by instructions of the CPU 901. The change unit 97 implements the similar or substantially the similar function to that of the change unit 37a.

The communication unit 98 is implemented by instructions of the CPU 901. The communication unit 98 implements the similar or substantially the similar function to that of the communication unit 38a.

The data storage/read unit 99 is implemented by instructions of the CPU 901. The data storage/read unit 99 stores data or information in the memory 9000 or reads out data or information from the memory 9000.

<<Example of Operation>>
<Example of Participation Process>

Referring to FIG. 15 to FIG. 20, a description is given hereinafter of an operation or processes performed by each apparatus. Firstly, an operation by the videoconference terminal 3 of participating in a specific communication session is described with reference to FIG. 15 and FIG. 16.

Figure 15:
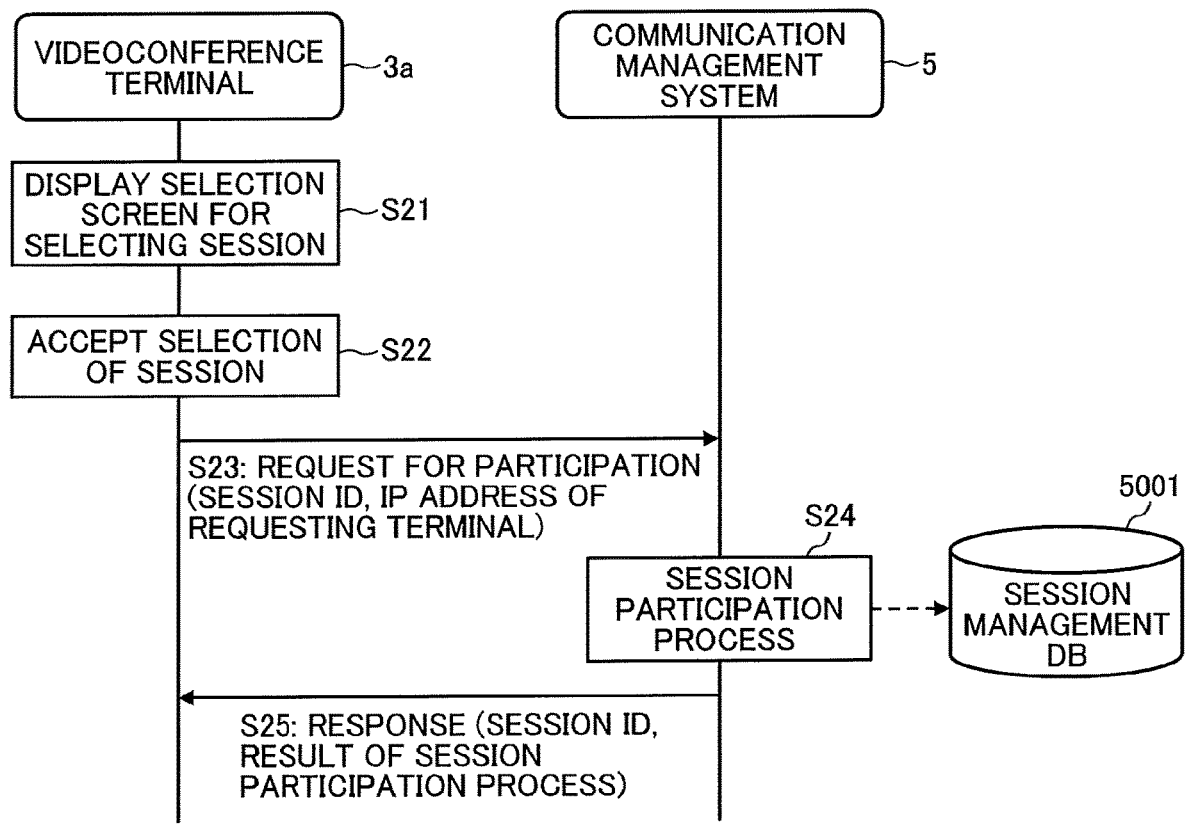
FIG. 15 is a sequence diagram illustrating an example of an operation of participating in a specific communication session according to an embodiment of the present disclosure.

FIG. 15 is a sequence diagram illustrating an example of an operation of participating in a specific communication session according to an embodiment of the present disclosure.

Figure 16:
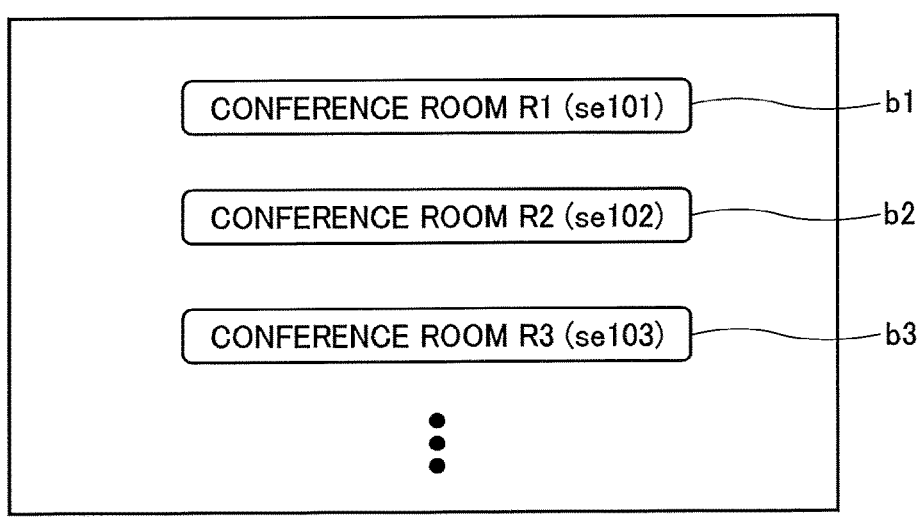
FIG. 16 is a view illustrating an example of a selection screen for accepting selection of a desired communication session (virtual conference), according to an embodiment of the present disclosure.

FIG. 16 is a view illustrating an example of a selection screen for accepting selection of a desired communication session (virtual conference), according to an embodiment of the present disclosure.

First, a user (e.g., the user A1) at the site A (FIG. 8) operates the videoconference terminal 3a to display the selection screen that allows the user to select a desired communication session (virtual conference). In other words, the acceptance unit 32a accepts an instruction to display the selection), which is input by the user A1.

At S21, the display control 34a controls the display 4a (FIG. 8) to display the selection screen as illustrated in FIG. 16. In the illustrated example, selection buttons b1, b2, and b3 are displayed on the selection screen, which respectively represent virtual conference rooms R1, R2, R3, each being a selection target. Each of the selection buttons b1, b2, and b3 is associated with the session ID.

At S22, the acceptance unit 32a accepts selection of a communication session. For example, when the user A1 selects (presses) a desired selection button (in this example, the selection button b1) on the selection screen, the acceptance unit 32a accepts selection of the communication session.

At S23, the data exchange unit 3a transmits a request for participating in a virtual conference room to the communication management system 5. This participation request includes the session ID identifying the communication session for which the selection is accepted at S22, and the IP address of the videoconference terminal 3a as a request sender terminal. The communication management system 5 receives the participation request at the data exchange unit 51.

At S24, the data storage/read unit 99 performs a process for enabling the videoconference terminal 3a to participate in the communication session. More specifically, the data storage/read unit 99 adds the IP address that is received at S23 in the session management DB 5001 (Table 9). In this case, the IP address is added to a field for the participating terminal IP address in a record of the same session ID as the session ID received at S23.

At S25, the data exchange unit 51 transmits a response to the participation request to the videoconference terminal 3a. This response to the participation request includes the session ID that is received at S23, and a result of the participation process. The videoconference terminal 3a receives the response to the participation request at the data exchange unit 31a. The following describes a case in which the process for enabling the videoconference terminal 3a to participate in the communication session is successfully completed.

<Example of Management Process of Image Type Information>

Hereinafter, referring to FIG. 17, a description is given of a management process of the image type information.

Figure 17:
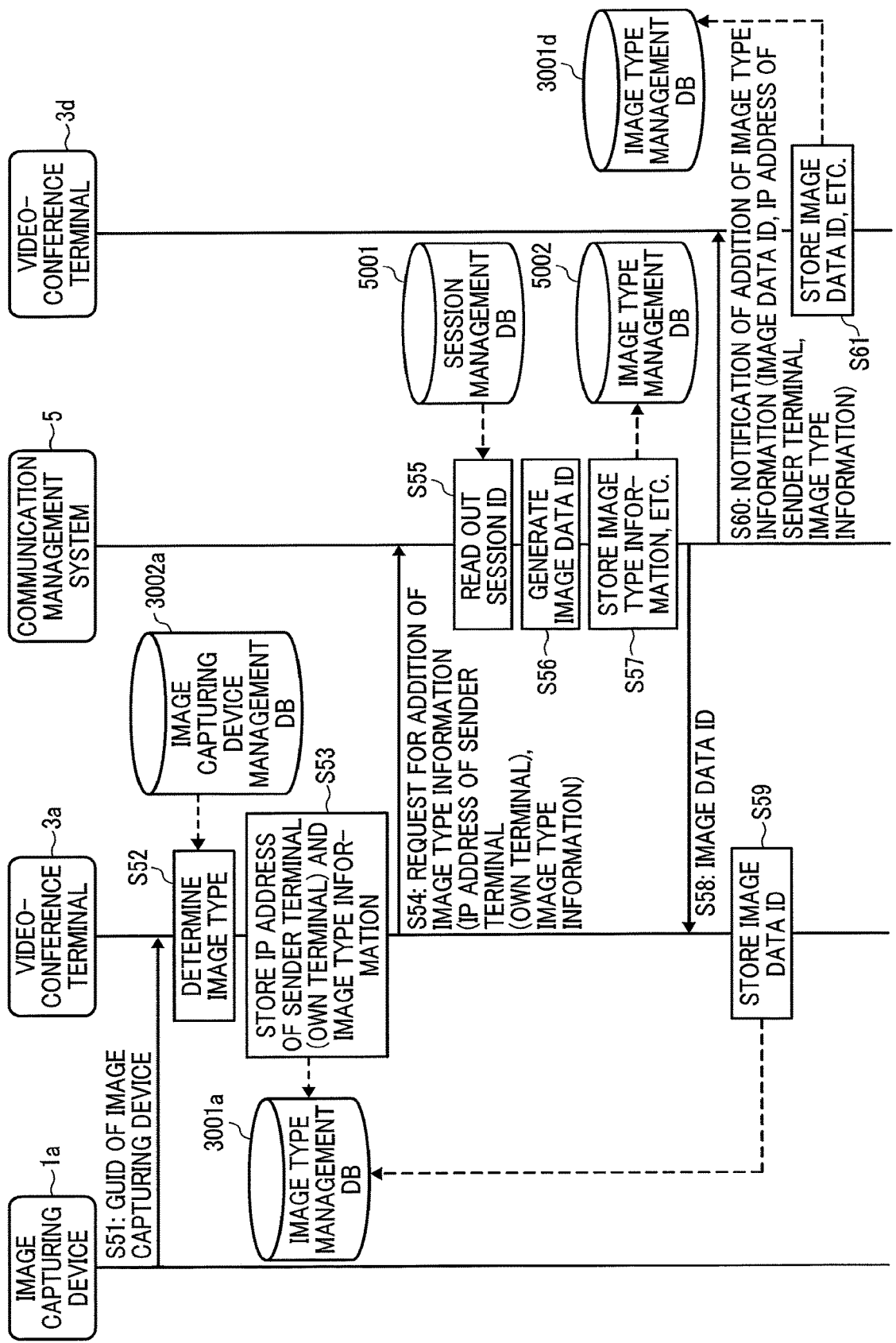
FIG. 17 is a sequence diagram illustrating an example of an operation of managing image type information, according to an embodiment of the present disclosure.

FIG. 17 is a sequence diagram illustrating an example of an operation of managing the image type information according to an embodiment of the present disclosure.

At S51, the communication unit 18a transmits its own GUID to the communication unit 38a of the videoconference terminal 3a. First, when the user A1 connects the cradle 2a, on which the image capturing device 1a is mounted, to the videoconference terminal 3a, using the wired cable such as a USB cable, the data storage/read unit 19a of the image capturing device 1a reads out the GUID of the own device (i.e., the image capturing device 1a) from the memory 1000a. Then, the communication unit 18a transmits the read-out GUID. The videoconference terminal 3a receives the GUID of the image capturing device 1a at the communication unit 38a.

Next, at S52, the determining unit 35a of the videoconference terminal 3a determines an image type. For example, the determination unit 35a determines whether the same vendor ID and product ID as those of the GUID received at S51 are stored in the image capturing device management DB 3002a (Table 2).

The determination unit 35a determines that the image capturing device 1a is an image capturing device that captures a "special image" (e.g., a full spherical panoramic image) based on determination that the same vender ID and product ID are stored in the image capturing device management DB 3002a. By contrast, the determination unit 35a determines that the image capturing device 1a is an image capturing device that captures a "general image", based on determination that the same vender ID and product ID are not stored in the image capturing device management DB 3002a.

At S53, the data storage/read unit 39a stores the IP address of the own terminal (i.e., videoconference terminal 3a) as the sender terminal and the image type information. For example, the data storage/read unit 39a stores, in the image type management DB 3001a (Table 1), the IP address of the own terminal in association with the image type information, which is a determination result generated at S52. In this example, the image data ID is not yet associated in this state.

Examples of the image type information include the source name that is determined according to a predetermined naming rule, and data indicating the image type (e.g., a "general image" or a "special image").

At S54, the data exchange unit 31a transmits a request for adding the image type information to the communication management system 5. In this example, this request for adding image type information includes the IP address of the own terminal and the image type information, both being stored at S53 in association with each other. The communication management system 5 receives the request for adding the image type information at the data exchange unit 51.

At S55, the data storage/read unit 59 of the communication management system 5 searches the session management DB 5001 (Table 9) using the IP address of the sender terminal received at S54 as a search key. Thus, the data storage/read unit 59 reads out the session ID associated with the IP address of the sender terminal.

At S56, the generator 56 of the communication management system 5 generates an image data ID. For example, the generator 56 generates a unique image data ID.

At S57, the data storage/read unit 59 of the communication management system 5 stores the image type information, etc., in the image type management DB 5002 (Table 10). More specifically, the data storage/read unit 59 generates a new record in the image type management DB 5002. In the new record, the session ID that is read out at S55, the image data ID generated at S56, the IP address of the sender terminal and the image type information that are received at S54 are stored in association with one another.

At S58, the data exchange unit 51 of the communication management system 5 transmits the image data ID generated at S56 to the videoconference terminal 3a. The videoconference terminal 3a receives the image data ID at the data exchange unit 31a.

At S59, the data storage/read unit 39a of the videoconference terminal 3a stores, in the image type management DB 3001a (Table 1), the image data ID. More specifically, the data storage/read unit 39a stores the image data ID received at S58, in association with the IP address of the own terminal and the image type information that are stored at S53.

At S60, the data exchange unit 51 of the communication management system 5 transmits a notification of addition of the image type information to other communication terminal (the videoconference terminal 3d, in this example). In this example, this notification of addition of the image type information includes the image data ID generated at S56, and the IP address of the own terminal and the image type information that are stored at S53. The videoconference terminal 3d receives the notification of addition of the image type information at the data exchange unit 31a.

The destination to which the data exchange unit 51 transmits the notification is determined based on the session management DB 5001 (Table 9). More specifically, in this example, the destination is other IP address that is associated with the same session ID as the session ID associated with the IP address of the videoconference terminal 3a In other words, the destination is other communication terminal that is in the same virtual conference room as the videoconference terminal 3a.

At S61, the data storage/read unit 39d of the videoconference terminal 3d stores the image data ID, etc., in the image type management DB 3001d (Table 1). More specifically, the data storage/read unit 39d generates a new record in the image type management DB 3001d. The data storage/read unit 39d stores, in the new record, the image data ID, the IP address of the sender terminal, and the image type information, which are received at S60. In substantially the same manner, the notification of addition of the image type information is transmitted to the PC 7 and the smartphone 9, each being other communication terminal. The PC 7 and the smartphone 9 each stores the image data ID, the IP address of the sender terminal, and the image type information, in corresponding one of the image type management DB 7001 and the image type management DB 9001. Through the operation as described heretofore, the same information is shared among the communication terminals in the image type management DBs 3001a. 3001d, 7001 and 9001, respectively.

<Example of Resolution Request Process>

Hereinafter, referring to FIG. 18, a description is given of an example of a resolution request process.

Figure 18:
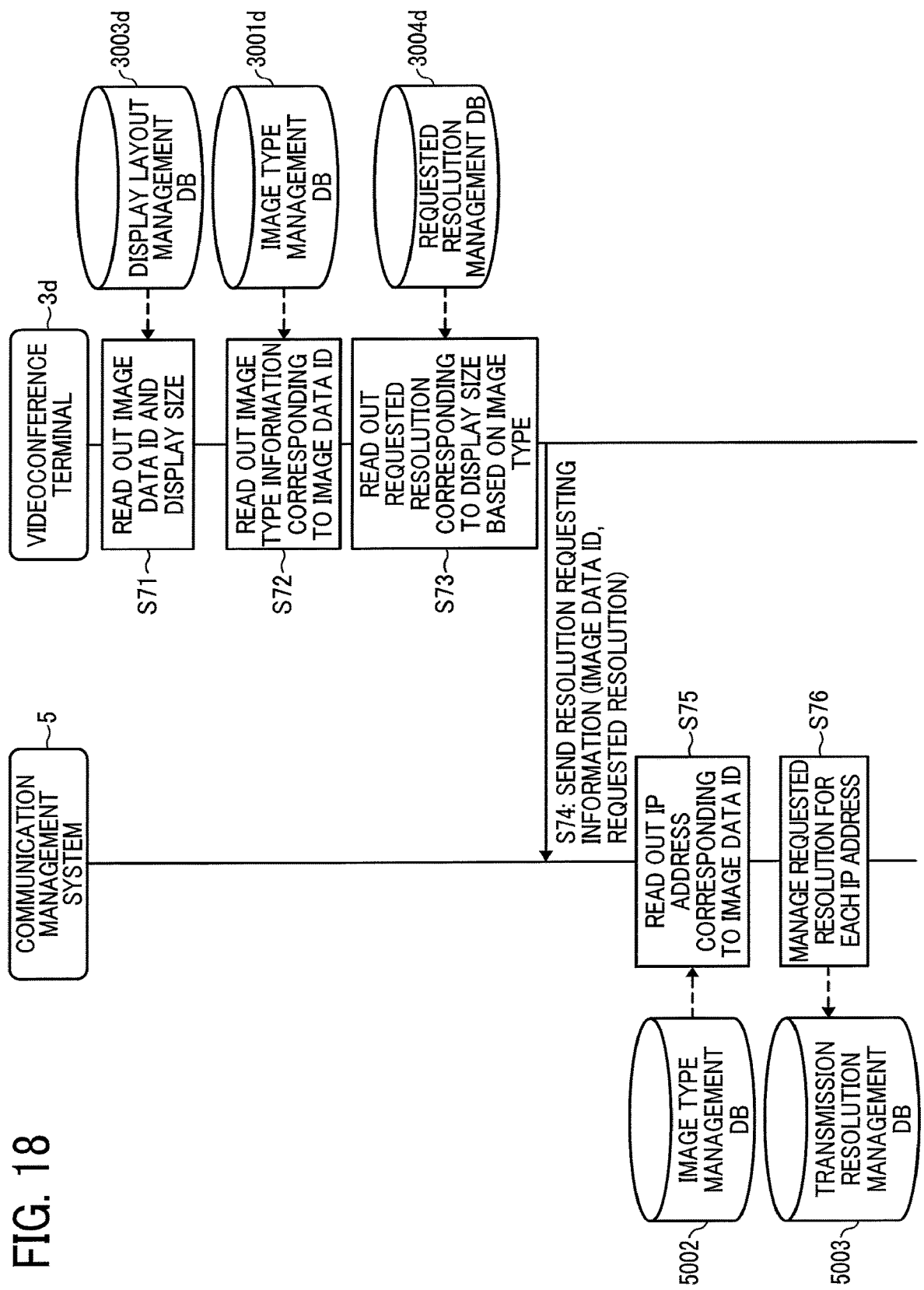
FIG. 18 is a sequence diagram illustrating an example of an operation of requesting resolution, according to an embodiment of the present disclosure.

FIG. 18 is a sequence diagram illustrating an example of an operation of requesting resolution, according to an embodiment of the present disclosure.

At S71, the data storage/read unit 39d of the videoconference terminal 3d reads out each information item of the image data ID and the display size from the display layout management DB 3003d (Table 6).

At S72, the data storage/read unit 39a reads out the image type information. For example, the data storage/read unit 39a searches the image type management DB 3001d using the image data ID that is read out at S71 as a search key, to read out the image type information associated with that image data ID.

At S73, the data storage/read unit 39a reads out the required resolution. For example, the data storage/read unit 39a reads out the required resolution based on the image type information that is read out at S72. More specifically, the data storage/read unit 39a first selects one of the tables as illustrated in Table 7 and Table 8 in the required resolution management DB 3004d. Further, the data storage/read unit 39a searches the selected table using the display size that is read out at S71 as a search key, to read out the required resolution associated with that display size.

At S74, the data exchange unit 3d of the videoconference terminal 3d transmits required resolution information to the communication management system 5. In this example, this resolution request information contains the image data ID that is read out at S71 and the required resolution that is read out at S73. The communication management system 5 receives the resolution request information at the data exchange unit 51.

At S75, the data storage/read unit 59 of the communication management system 5 reads out the IP address of the sender terminal associated with the image data ID. For example, the data storage/read unit 59 searches the image type management DB 5002 (Table 10) using the image data ID received at S74 as a search key, to read out the IP address of the sender terminal associated with that image data ID.

At S76, the data storage/read unit 59 of the communication management system 5 stores the required resolution for each IP address. More specifically, the data storage/read unit 59 stores, in the transmission resolution management DB 5003, the required resolution received at S75 in accordance with the IP address that is read out at S75.

A description is given heretofore of an example in which the videoconference terminal 3d transmits the resolution request information to the communication management system 5, with reference to FIG. 18. Other communication terminals (videoconference terminal 3a, PC 7, and smartphone 9) also perform the same or substantially the same operation as the videoconference terminal 3d. Accordingly, redundant description thereof is omitted below.

As all the communication terminals perform the operation as illustrated in FIG. 18, all the required resolutions are filled and managed in the transmission resolution management DB 5003 as illustrated in Table 11.

<Example of Image Data Transmission Process>

Hereinafter, referring to FIGS. 19 to 21, a description is given of an example of an image data transmission process in video calling.

Figure 19:
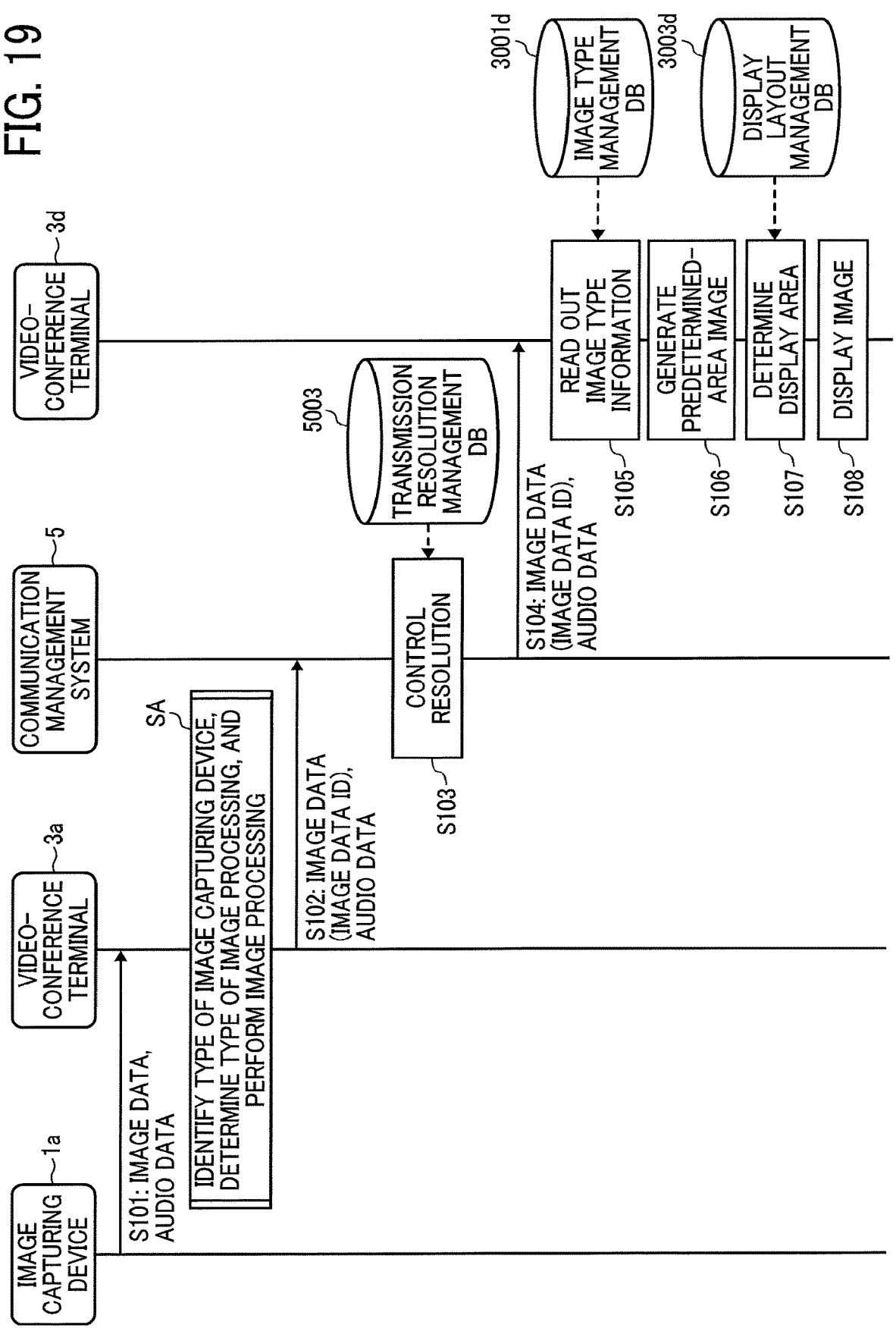
FIG. 19 is a sequence diagram illustrating an example of an operation of communicating image data in video calling, according to an embodiment of the present disclosure.

FIG. 19 is a sequence diagram illustrating an example of an image data transmission process in video calling according to an embodiment of the present disclosure.

At S101, the communication unit 18a of the image capturing device 1a transmits image data and audio data to the communication unit 38a of the videoconference terminal 3a. In this example, the image capturing device 1a is a device that is able to obtain two hemispherical images. Therefore, in this example, the image data transmitted at S101 is data of two hemispherical images, for example, as illustrated in FIGS. 3A and 3B. The videoconference terminal 3a receives the image data and the audio data at the communication unit 38a.

At step SA, the videoconference terminal 3a identifies an image capturing device, determines what image processing is to be performed, and performs the determined image processing. A detailed description is given later of step SA, i.e., identifying the image capturing device, determining and performing the image processing. First, the type of the image capturing device 1a is identified by the image capturing device identification process. Next, the type of image processing to be performed is determined based on a result of the identification process. Subsequently, the videoconference terminal 3a performs the determined image processing and thereby generates image data. Accordingly, the image data is transmitted on which the image processing has been performed at the subsequent step S102.

At S102, the data exchange unit 31a of the videoconference terminal 3a transmits, to the communication management system 5, the image data processed at step SA and the audio data. An image data ID for identifying the image data is also transmitted at S102. Thus, the communication management system 5 receives the image data, the audio data, and the image data ID, at the data exchange unit 51.

At S103, the resolution controller 53 of the communication management system 5 performs control to change the resolution of the image data received at S102, based on the required resolution stored in the transmission resolution management DB 5003. When the resolution of the image data received at S102 is the same as the required resolution managed in the transmission resolution management DB 5003, the resolution controller 53 does not have to change the resolution.

At S104, the data exchange unit 51 of the communication management system 5 transmits, to the videoconference terminal 3d, the image data on which the control of resolution has been performed at S103 and the audio data. The image data ID is also transmitted at S104. Thus, the videoconference terminal 3d receives the image data, the image data ID, and the audio data at the data exchange unit 31d.

At S105, the data storage/read unit 39d of the videoconference terminal 3d reads out the image type information (source name). More specifically, the data storage/read unit 39d searches the image type management DB 3001d (Table 1) using the image data ID received at S104 as a search key, to read out the image type information (source name) associated with that image data ID.

At S106, when the image type information is a "special image", i.e., when the image type information is "Video_Theta", the image and audio processor 33d of the videoconference terminal 3d generates a full spherical panoramic image from the image data received at S104. Furthermore, the image and audio processor 33d generates a predetermined-area image from the full spherical panoramic image.

At S107, the data storage/read unit 39d of the videoconference terminal 3d determines one of the plurality of display areas in which an image to be displayed. More specifically, the data storage/read unit 39d searches the display layout management DB 3003d (Table 6) using the image data ID received at S104 as a search key to read out the layout number associated with that image data ID. Thus, the data storage/read unit 39d determines a display area in which the image data received at S104 is to be displayed, from the plurality of display areas of the display 4d.

At S108, the display control 34d of the videoconference terminal 3d displays the predetermined-area image in the display area determined at S107. When the image type information is a "general image", i.e., when the image type information is "Video", the image and audio processor 33d does not generate a full spherical panoramic image from the image data received at S104. In this case, the display control 34d displays a "general image".

Figure 20:
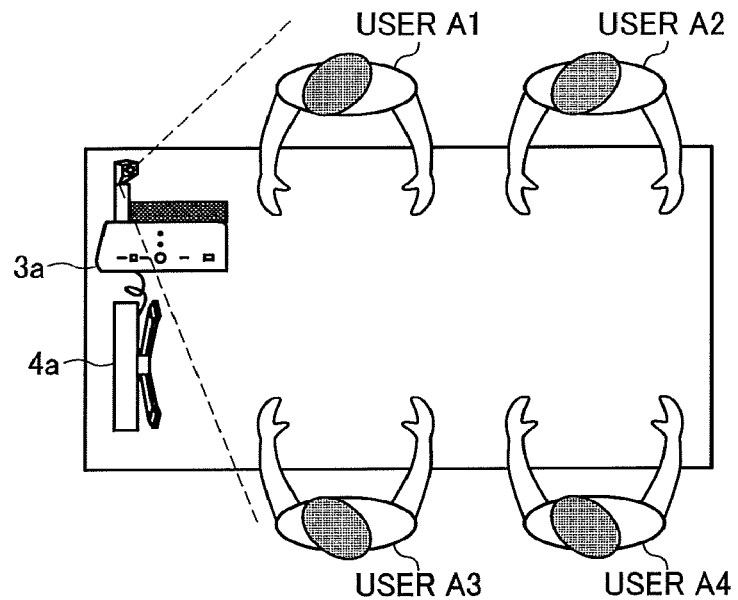
FIG. 20 illustrates an example state of video calling using a general image is used, according to an embodiment of the present disclosure.
Figure 21:
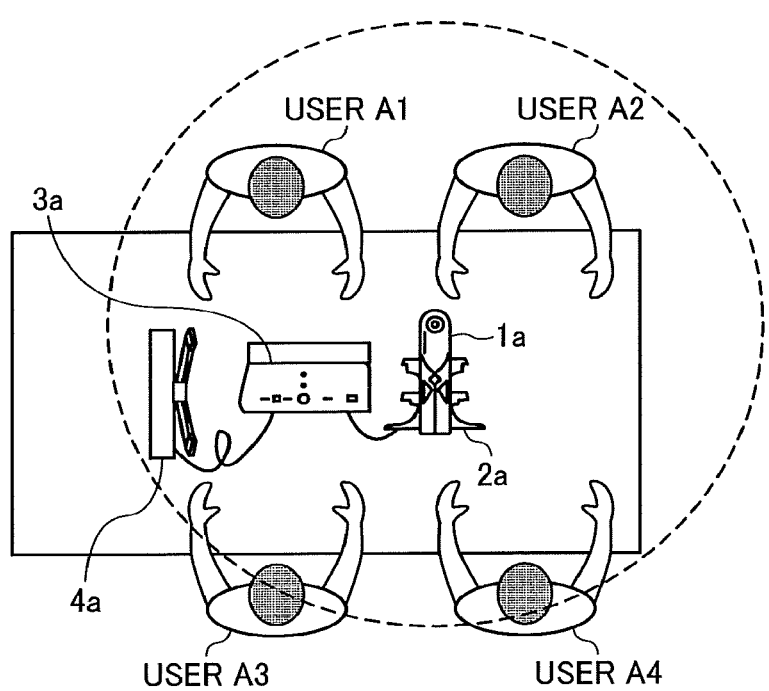
FIG. 21 illustrates an example state of video calling using a special image is used, according to an embodiment of the present disclosure.

Next, referring to FIG. 20 and FIG. 21, a description is given of a state of video calling.

FIG. 20 illustrates an example state of video calling in which a "general image" is used, according to an embodiment of the present disclosure. First, a description is given of an example case in which video calling is performed without using the image capturing device 1a, i.e., an example in which video calling is performed using the camera 312 (FIG. 10), as illustrated in FIG. 20. In this case, the videoconference terminal 3a has to be placed at the corner of a desk, so that the users A1 to A4 can be captured with the camera 312, because the angle of view of the camera 312 is horizontally 125 degrees and vertically 70 degrees. This requires the users A1 to A4 to talk in the video calling, while looking in the direction of the videoconference terminal 3a.

Further, because the users A1 to A4 look in the direction of the videoconference terminal 3a, the display 4a has also to be placed near the videoconference terminal 3a. This requires the user A2 and the user A4, who are away from the videoconference terminal 3a, to talk in a relatively loud voice, because they are away from the microphone 314 (FIG. 10). In addition, since the user A2 and the user A4 are way form the display 4a, it may be difficult for them to see contents displayed on the display 4a.

FIG. 21 illustrates an example state of video calling in which a "special image" is used, according to an embodiment of the present disclosure. As illustrated in FIG. 21, when the image capturing device 1a is used, the videoconference terminal 3a and the display 4a can be placed closer to at the center of the desk, compared with the example case illustrated in FIG. 20, because the image capturing device 1a is capable of obtaining two hemispherical images. This enables the users A1 to A4 to talk in a relatively small voice, because they are close to the microphone 314. Further, it gets easier for the users A1 to A4 to see contents displayed on the display 4a.

Hereinafter, referring to FIG. 22 and FIG. 23, a description is given of a display example on the display 4d at the site D. The display example of the display 4d at the site D (FIG. 8) will be described below.

FIG. 22 is a view illustrating a display example of two hemispherical images according to an embodiment of the present disclosure. In other words, FIG. 22 illustrates an example in which the hemispherical images are displayed as they are, without the generation of a full spherical panoramic image and a predetermined-area image from image data transmitted from the image capturing device 1a (videoconference terminal 3a) or the image capturing device 1b (smartphone 9).

FIG. 23 is a view illustrating a display example of a predetermined-area image according to an embodiment of the present disclosure. In other words, FIG. 23 illustrates an example in which a predetermined-area image is displayed, which is generated based on a full spherical panoramic image generated from the image data transmitted from the image capturing device 1a(videoconference terminal 3a) or the image capturing device 1b (smartphone 9).

In the examples illustrated in FIG. 22 and FIG. 23, an image indicating the site A is displayed in a left-side display area (i.e., a display area to which a layout number "1" is assigned) of the display 4d.

Further, in the examples illustrated in FIG. 22 and FIG. 23, an image indicating the site B is displayed in an upper-right display area (i.e., a display area to which a layout number "2" is assigned) of the display 4d.

Furthermore, in the examples illustrated in FIG. 22 and FIG. 23, an image indicating the site C is displayed in a middle-right display area (i.e., a display area to which a layout number "3" is assigned) of the display 4d.

Furthermore, an image indicating the site D (i.e., the site where the videoconference terminal 3d itself is located) is displayed in a lower-right display area (i.e., a display area to which a layout number "4" is assigned) of the display 4d.

FIG. 22 illustrates an example in which the image data transmitted from the image capturing device 1a or the image capturing device 1b, each being capable of capturing a full spherical panoramic image, is displayed as it is. Accordingly, in the example illustrated in FIG. 22, the images of the site A and the site B (the images displayed in the display areas to which the display numbers "1" and "2" are assigned) are displayed by the front-side hemispherical image as illustrated in FIG. 3A and the back-side hemispherical image as illustrated in FIG. 3B.

By contrast, when the image and audio processor 33d generates a full spherical panoramic image based on the two hemispherical images and further generates the predetermined-area image, the predetermined-area image, which is a planar image, is displayed as illustrated in FIG. 23. Further, the general image is displayed in each of the display areas to which the display numbers "3" and "4" are assigned, because the image capturing device 8 and the camera 312 built in the videoconference terminal 3d, each being an image capturing device that obtains a general image, are used in the site C and the site D, respectively.

Furthermore, a user is able to change an area indicated by the predetermined-area image. More specifically, when the user D1, D2 or D3 operates the operation key 308 or moves his/her finger or a stylus on the touch panel of the display 4d, the acceptance unit 32d detects an instruction for changing the area. The display control 34d shifts, rotates, reduces, or enlarges the predetermined-area image based on the instruction detected by the acceptance unit 32d. This enables to change the area represented by the predetermined-area image so that the user A3 and the user A4 are displayed, even in a case in which an image of the site A displayed according to an initial setting (by default) in the display area to which the display number "1" is assigned contains only the user A1 and the user A2 as illustrated in FIG. 23.

As described heretofore, according to an embodiment of the present disclosure, the communication terminal such as the videoconference terminal 3a receives image data along with an image data ID for identifying that image data, and determines the corresponding image type information based on the received image data ID. Further, based on the determined image type information, the communication terminal generates a full spherical panoramic image, and further generates a predetermined-area image. This enables the communication terminal to display an image as illustrated in FIG. 23, for example.

Furthermore, the communication management system 5 controls the resolution of image data depending on an image type indicated by the image type information (S103). This prevents the resolution of an image displayed on a display from getting too low, and thereby preventing a user who views the image on the display from having difficulty in recognizing the surroundings or attendants of a communication counterpart. In other words, the configurations and the operations as described heretofore enable to display an image suitable for viewing.

<Variation>

Hereinafter, referring to FIG. 24, a description is given of another example of the resolution request process.

Figure 24:
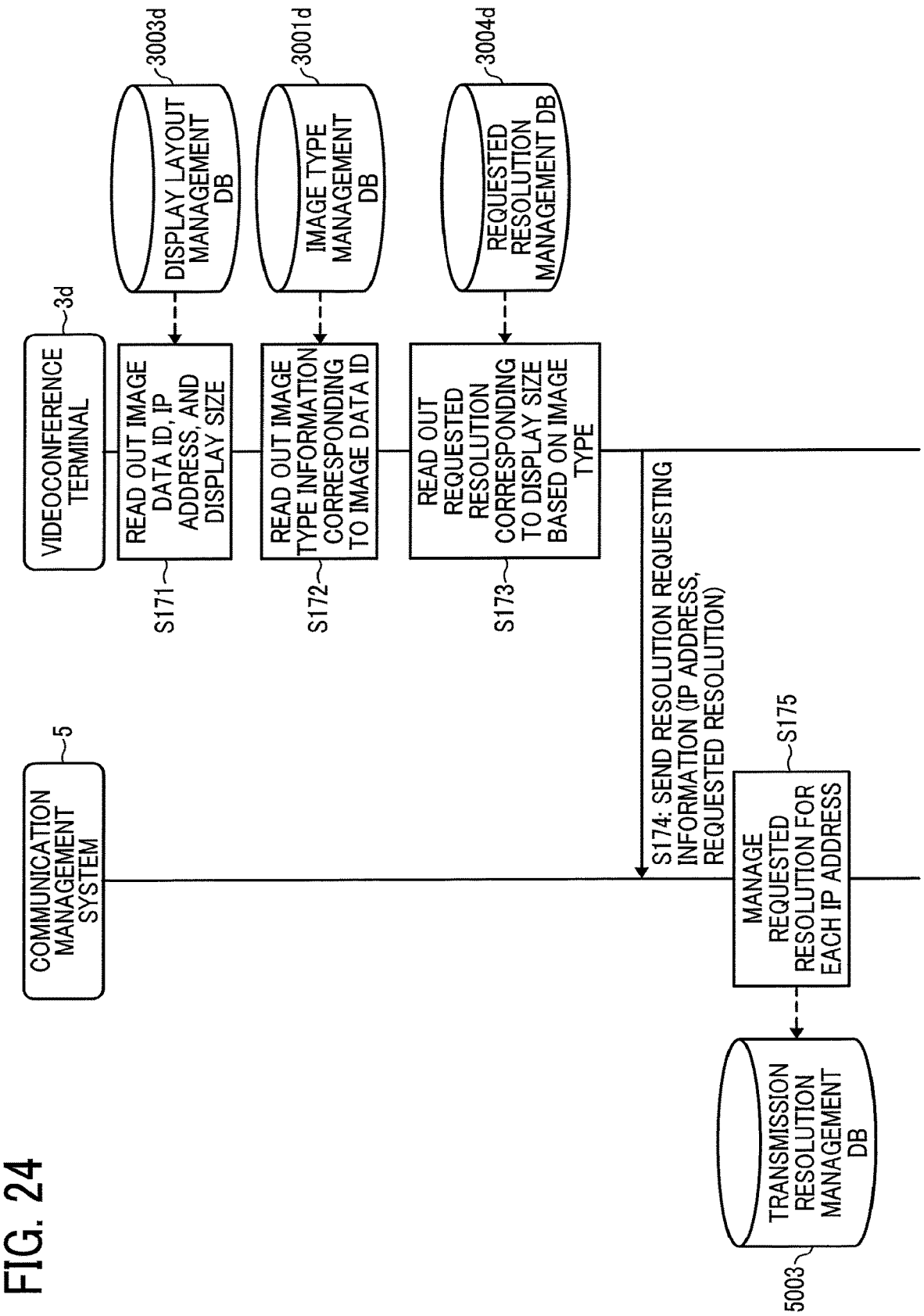
FIG. 24 is a sequence diagram illustrating another example of an operation of requesting the resolution, according to an embodiment of the present disclosure.

FIG. 24 is a sequence diagram illustrating another example of an operation of requesting the resolution, according to an embodiment of the present disclosure.

At S171, the data storage/read unit 39d reads out the image data ID, the IP address and the display size. In comparison with S71 of FIG. 18, the data storage/read unit 39d reads out the IP address in addition to the image data ID and the display size from the display layout management DB 3003d at S171.

At S172, the data storage/read unit 39a reads out the image type information corresponding to the image data ID. For example, S172 is the same or substantially the same process as S72 of FIG. 18.

At S173, the data storage/read unit 39a reads out the required resolution corresponding to the display size, based on an image type indicated by the image type information. For example, S173 is the same or substantially the same process as S73 of FIG. 18.

At S174, the data exchange unit 31d transmits the resolution request including the IP address and the required resolution. The process of S174 is different from S74 of FIG. 18 in that the data exchange unit 31d transmits the IP address that is read out at S171 in place of the image data ID.

At S175, the data storage/read unit 59 stores the required resolution for each IP address. In this example, the communication management system 5 does not have to perform the same or substantially the same process as S75 of FIG. 18, because the communication management system 5 receives the IP address at S174. Accordingly, at S175, the data storage/read unit 59 performs the same or substantially the same process as S76 of FIG. 18.

<<Example of Identification of Image Capturing Device, Determination and Execution of Image Processing>>

Figure 25:
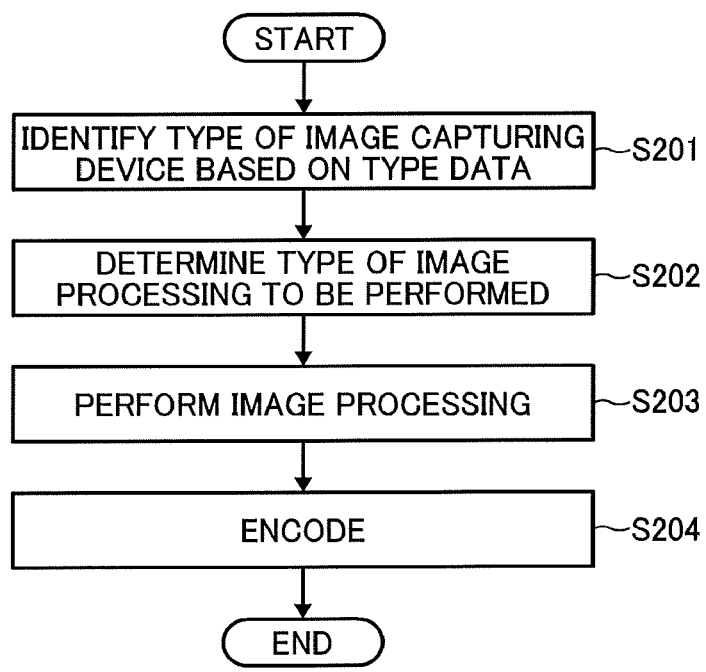
FIG. 25 is a flowchart illustrating an example of identification of an image capturing device, determination of image processing, and execution of image processing, according to an embodiment of the present disclosure.

FIG. 25 is a flowchart illustrating an example of identification of an image capturing device, determination of image processing to be executed, and execution of the image processing, according to an embodiment of the present disclosure. The processes of the flowchart as illustrated in FIG. 28 are performed at step SA of FIG. 19.

At S201, the videoconference terminal 3a identifies a type of the image capturing device 1a based on type data. The type data is data for identifying the type of image capturing device 1a. More specifically, the type data is data indicating the GUID. In this example, the GUID is obtained in advance at S51 of FIG. 17. In other words, the type data is generated at S51.

When the videoconference terminal 3a has information on the GUID such as the vendor ID and the product ID, the terminal 3a is able to identify the type of the image capturing device 1a. In other words, the videoconference terminal 3a is able to determine whether the image capturing device 1a is an image capturing device that obtains data of two hemispherical images from which a "special image" (e.g., a full spherical panoramic image) is generated. Hereinafter, a description is given of both a case in which a determination result by the videoconference terminal 3a indicates that the image capturing device 1a is an image capturing device that obtains data of two hemispherical images, and a case in which the determination result indicates that the image capturing device 1a is an image capturing device that captures a "general image".

In another example, the videoconference terminal 3a performs determination other than determining whether the image capturing device 1a is an image capturing device that obtains data of two hemispherical images. For example, the videoconference terminal 3a may determine whether the image capturing device 1a is an image capturing device that captures an image with a single optical system (e.g., so-called monocular camera) or an image capturing device that captures an image with two or more optical systems (e.g., so-called compound-eye camera).

In addition, the videoconference terminal 3a may determine whether the image capturing device 1a is an image capturing device that captures an image with a so-called "wide-angle" lens. For example, the videoconference terminal 3a may determine whether the image capturing device 1a is an image capturing device whose angle of view is equal to or more than a predetermined degree (e.g., 130 degrees).

At S202, the videoconference terminal 3a determines a type of image processing to be performed. More specifically, at S202, the videoconference terminal 3a determines processing to be performed in the subsequent step S203.

For example, when the determination result indicates that the image capturing device 1a is an image capturing device that obtains data of two hemispherical images from which a special image (e.g., a full spherical panoramic image) is generated, the videoconference terminal 3a determines that a process of changing the resolution of image data is to be prevented from being performed at the subsequent step S203. Hereinafter, the process of changing the resolution of the image data is referred to as a "first process". In addition or in alternative, when the determination result indicates that the image capturing device 1a is an image capturing device that obtains data of two hemispherical images from which the special image (e.g., a full spherical panoramic image) is generated, the videoconference terminal 3a determines that a process of cutting out a part of image represented by the image data is to be prevented from being performed at the subsequent step S203. Hereinafter, the process of cutting out a part of image is referred to as a "second process".

By preventing the first process from being performed, the resolution of the image data before image processing at S203 is kept unchanged after that image processing. Therefore, the image data transmitted at S102 has a high resolution. In other words, at S202, the videoconference terminal 3a determines that the first process is to be prevented from being performed so that the resolution does not decrease by image processing.

By preventing the second process from being performed, a range represented by the image data before image processing at S203 is kept unchanged after that image processing. For example, in a case in which the data of two hemispherical images obtained by the image capturing device 1a represents an omnidirectional range (horizontally 360-degree range), by preventing the second process from being performed, the image data after image processing at S203 still represents the omnidirectional range. Therefore, the image data transmitted at S102 represents the range captured by the image capturing device 1a. In other words, at S202, the videoconference terminal 3a determines that the second process is to be prevented from being performed so that a part of range is not deleted from the image data by image processing.

When the first process and/or the second process is/are prevented from being performed, a size of the image data is likely to be relatively large. In view of this, at S202, the videoconference terminal 3a may determine that image processing for decreasing the frame rate of image data to be transmitted at S102 is to be performed at S203. For example, the videoconference terminal 3a controls the frame rate of image data (e.g., data of two hemispherical images) to be about one tenth of the frame rate of "general image" data. The ratio at which the frame rate is reduced is predetermined based on a bandwidth used for transmitting image data, for example.

By contrast, when the determination result indicates that the image capturing device 1a is not an image capturing device that obtains data of two hemispherical images, that is, the image capturing device 1a is an image capturing device that captures a general image, the videoconference terminal 3a determines that the first process and the second process are to be performed at the subsequent step S203.

At S203, the videoconference terminal 3a performs image processing. That is, at S203, the videoconference terminal 3a performs so-called "reprocessing". The image processing performed at S203 is the image processing determined at S202.

At S204, the videoconference terminal 3a encodes the image data.

The videoconference terminal 3a may determine, at S202, that image processing for converting color image data into monochrome image data is to be performed at the subsequent step S203. When the first process and/or the second process is/are prevented from being performed as described above, a size of the image data is likely to be relatively large. In view of this, the videoconference terminal 3a may convert the image data into monochrome image data to reduce the data amount. In addition, the videoconference terminal 3a may determine, at S202, that image processing for reducing data of U and V in the YUV format is to be performed at the subsequent step S203. More specifically, the videoconference terminal 3a may determine that the image data in the YUV 444 format is to be converted to image data in the YUV 422 or YUV 411 format, for example, at the subsequent step S203.

Furthermore, at S202, the videoconference terminal 3a may determine parameters for encoding the image data at S204. For example, at S202, the videoconference terminal 3a may determine the parameters so that the encoded image has a high image quality, when there is spare capacity in a data transmission bandwidth or when a CPU can afford the increase of processing load. For example, the videoconference terminal 3a may determine an aspect ratio.

When an original image (e.g., two hemispherical images) used for generating a full spherical panoramic image has low image quality, the quality of the generated full spherical panoramic image is likely to be degraded. In addition, when a part of the original image is cut out, there may be a case in which a communication terminal such as the videoconference terminal 3a cannot generate a full spherical panoramic image. In this case, no image is displayed on a display. As described above, when the first process or the second process is performed, there may be a case in which no image is displayed or the image quality is degraded such as an image that is not suitable for viewing is displayed. To address such issue, the videoconference terminal 3a determines, at S202, which image processing is to be performed based on the result of determination at S201. This enables to prevent image processing that causes degradation of a special image (e.g., full spherical panoramic image) from being performed. Accordingly, image quality is enhanced.

<Example of Functional Configuration>

Figure 26:
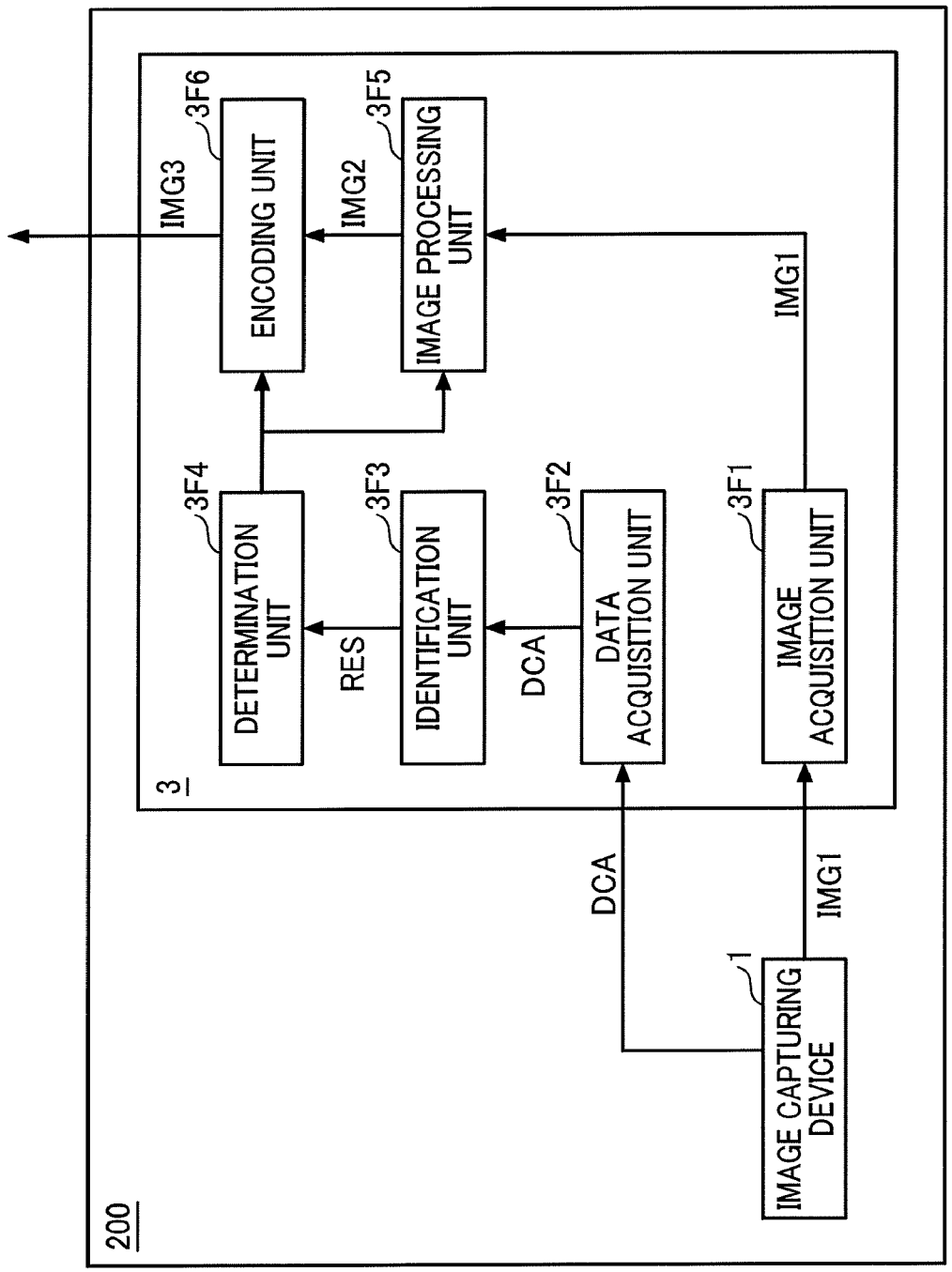
FIG. 26 is a block diagram illustrating an example of a functional configuration of an image processing apparatus according to an embodiment of the present disclosure.

FIG. 26 is a block diagram illustrating an example of a functional configuration of an image processing apparatus according to an embodiment of the present disclosure. For example, an image processing system 200 includes the videoconference terminal 3 as an example of an image processing apparatus and the image capturing device 1. The image processing system 200) has a functional configuration including an image acquisition unit 3F1, a data acquisition unit 3F2, an identification unit 3F3, a determination unit 3F4, and an image processing unit 3F5. The image processing system 200 may further include an encoding unit 3F6 as illustrated in the figure. Hereinafter, a description is given of the illustrated functional configuration as an example.

The image acquisition unit 3F1 acquires, from the image capturing device 1, an image (referred to as a "first image IMG1", hereafter) captured by the image capturing device 1. The image acquisition unit 3F1 is implemented by, for example, the external device connection I/F 318 (FIG. 10).

The data acquisition unit 3F2 acquires, from the image capturing device 1, type data DCA based on which a type of the image capturing device 1 is identified. The data acquisition unit 3F2 is implemented by, for example, the external device connection I/F 318 (FIG. 10).

The identification unit 3F3 identifies the type of the image capturing device 1 based on the type data DCA. The identification unit 3F3 is implemented by, for example, instructions of the CPU 301 (FIG. 10).

The determination unit 3F4 determines, based on a determination result RES by the identification unit 3F3, what image processing is to be performed by the image processing unit 3F5 and the parameters of encoding to be performed by the encoding unit 3F6. The determination unit 3F4 is implemented by, for example, instructions of the CPU 301 (FIG. 10).

The image processing unit 3F5 performs image processing on the first image IMG1. An image generated by image processing by the image processing unit 3F5 is hereinafter referred to as a "second image IMG2". The image processing unit 3F5 is implemented by, for example, instructions of the CPU 301 (FIG. 10).

The encoding unit 3F6 encodes the second image IMG2. An image generated by encoding by the encoding unit 3F6 is hereinafter referred to as a "third image IMG3". For example, the encoding unit 3F6 is implemented by, for example, instructions of the CPU 301 (FIG. 10).

In the operation illustrated in FIG. 19, the third image IMG3 is transmitted at S102.

With the configuration as described above, the image processing apparatus (e.g., the videoconference terminal 3) is able to determine the type of image capturing device 1 by the identification unit 3F3. Further, based on the type of the image capturing device 1 identified by the identification unit 3F3, the image processing apparatus determines, by the determination unit 3F4, processing to be performed by the image processing unit 3F5 and the encoding unit 3F6. This enables the image processing apparatus to improve image quality, even in a case in which a full spherical panoramic image is generated.

Further, those embodiments may be implemented by a program that causes a computer such as the image processing system to execute operations including processes as described.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

For example, although a description is given of an example in which a 360-degree full spherical panoramic image is generated from images captured by the image capturing device 1, a vide-angle view image having an angle of about 180 to 360 degrees in the horizontal direction may be generated from images captured by the image capturing device.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image processing apparatus communicable with an image capturing device that captures image data, the apparatus comprising circuitry to:
    acquire the image data captured by the image capturing device;
    determine a type of the image capturing device;
    when the determined type of the image capturing device is a spherical camera, at least one of restrict a changing of a resolution of the image data and restrict a cutting out a part of an image;
    perform the image processing according to a result of the determined type of the image capturing device; and
    perform an encoding on the image data which had the image processing performed,
    wherein the circuitry is further configured to reduce a frame rate at which the image data is output when the determined type of the image capturing device is a spherical camera.

2. The image processing apparatus of claim 1, wherein when the determined type of the image capturing device is a spherical camera, the changing the resolution of the image data is restricted.

3. An image processing system comprising:
    an image capturing device that captures image data; and
    one or more image processing apparatuses communicable with the image capturing device,
    the system comprising one or more processors to:
    acquire the image data captured by the image capturing device;
    determine whether the image data is data of a spherical image;
    based on whether the image data is data of a spherical image, at least one of restrict a change of a resolution of the image data and restrict cutting out a part of an image;
    perform the image processing according to a result of the determined type of the image capturing device; and
    perform an encoding on the image data which had the image processing performed,
    wherein the one or more processors are further to reduce a frame rate at which the image data is output when the determined type of the image capturing device is a spherical camera.

4. An information processing method performed by an image processing apparatus communicable with an image capturing device that captures image data, the method comprising:
    acquiring the image data captured by the image capturing device;
    determining a type of the image capturing device;
    when the determined type of the image capturing device is a spherical camera, at least one of restrict a change of a resolution of the image data and restrict cutting out a part of an image;
    perform the image processing according to a result of the determined type of the image capturing device; and
    performing an encoding on the image data which had the image processing performed,
    wherein the method further comprises reducing a frame rate at which the image data is output when the determined type of the image capturing device is a spherical camera.

5. The image processing system according to claim 3, wherein:
    the determining of whether the image data is data of a spherical image identifies which image capture device has captured the image data.

6. The image processing apparatus of claim 1, wherein when the determined type of the image capturing device is a spherical camera, the cutting out a part of the image is restricted.

7. The image processing system of claim 3, wherein:
    when the image data is determined to be data of a spherical image, the changing the resolution of the image data is restricted.

8. The image processing system of claim 3, wherein:
    when the image data is determined to be data of a spherical image, the cutting out a part of the image is restricted.

9. The method according to claim 4, wherein:
    when the determined type of the image capturing device is a spherical camera, the changing the resolution of the image data is restricted.

10. The method according to claim 4, wherein:
    when the determined type of the image capturing device is a spherical camera, the cutting out a part of the image is restricted.

* * * * *